United States Patent
Zhang et al.

(10) Patent No.: US 11,751,084 B2
(45) Date of Patent: Sep. 5, 2023

(54) NETWORK NODE, USER EQUIPMENT AND BASE STATION USED IN A COMMUNICATION SYSTEM AND METHOD FOR LOCATION RESOURCE COORDINATION

(71) Applicant: DATANG MOBILE COMMUNICATIONS EQUIPMENT CO., LTD., Beijing (CN)

(72) Inventors: Dajun Zhang, Beijing (CN); Haiyang Quan, Beijing (CN); Ming Ai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 195 days.

(21) Appl. No.: 17/273,651

(22) PCT Filed: Aug. 30, 2019

(86) PCT No.: PCT/CN2019/103629
§ 371 (c)(1),
(2) Date: Mar. 4, 2021

(87) PCT Pub. No.: WO2020/048393
PCT Pub. Date: Mar. 12, 2020

(65) Prior Publication Data
US 2021/0345147 A1    Nov. 4, 2021

(30) Foreign Application Priority Data
Sep. 5, 2018   (CN) .......................... 201811031438.0

(51) Int. Cl.
*H04W 24/10*   (2009.01)
*H04W 8/08*   (2009.01)
(Continued)

(52) U.S. Cl.
CPC ............. *H04W 24/10* (2013.01); *H04W 8/08* (2013.01); *H04W 64/003* (2013.01); *H04W 92/12* (2013.01)

(58) Field of Classification Search
CPC ....... H04W 24/10; H04W 8/08; H04W 64/00; H04W 64/003; H04W 92/12;
(Continued)

(56) References Cited

U.S. PATENT DOCUMENTS 8,019,347 B2 * 9/2011 Razdan et al. ................ 455/440
9,337,914 B2 * 5/2016 Nguyen et al. .... H04B 7/15507
(Continued)

FOREIGN PATENT DOCUMENTS

| | | |
|---|---|---|
| CN | 102065537 A | 5/2011 |
| CN | 102186191 A | 9/2011 |

(Continued)

OTHER PUBLICATIONS

User Equipment Localization In Mobile Communication Networks; KR 20190060834 A; published to Marcus et al. (Year: 2019).*
(Continued)

*Primary Examiner* — Meless N Zewdu
(74) *Attorney, Agent, or Firm* — Ladas & Parry, LLP

(57) ABSTRACT

A location resource coordinating method, a location resource coordinating device, a network node, a UE, and a base station are provided. The location resource coordinating method includes: sending location resource coordination information to a base station before performing location measurement for a serving UE; the location resource coordination information includes identity information of a target cell of the base station, and carries dedicated location resource information configured for the target cell, or the location resource coordination information includes the identity information of a target cell for which the base station
(Continued)

receiving a peer layers positioning protocol LPP message sent by a network node — 51 changing location configuration information according to the LPP message, wherein the LPP message carries updated location resource configuration information, and/or deleted location resource configuration information. The network node is a local location management function entity or a location management function entity — 52 station activates a location resource, and instructs the base station to activate pre-configured dedicated location resource information; the base station is a base station related to the serving UE.

20 Claims, 5 Drawing Sheets

(51) Int. Cl.
*H04W 64/00* (2009.01)
*H04W 92/12* (2009.01)

(58) Field of Classification Search
CPC ... H04W 88/18; H04W 92/045; H04W 28/16; H04W 4/02; H04W 4/50; H04W 88/02; H04W 88/00; H04W 88/08; H04W 4/029; H04W 28/00; H04W 28/02; H04W 76/00; H04W 76/11; H04W 28/18; H04W 92/04; H04W 24/00; H04W 8/14; H04W 4/023; H04W 4/025; H04W 4/021; G01S 1/042; G01S 1/0428; G01S 1/04; H04L 5/0053; H04L 27/2607; H04L 27/2613; H04L 5/0048; H04L 5/00; H04L 27/26; H04L 43/18; H04L 45/03; H04L 67/52; H04L 51/222; H04L 63/061; H04L 67/1053
See application file for complete search history.

(56) References Cited

U.S. PATENT DOCUMENTS

| | | | |
|---|---|---|---|
| 2006/0019679 A1* | 1/2006 | Rappaport et al. | 455/456.5 |
| 2011/0034181 A1* | 2/2011 | Jagetiya et al. | 455/456.2 |
| 2012/0157053 A1 | 6/2012 | Iwamura et al. | |
| 2013/0303160 A1* | 11/2013 | Fong et al. | H04W 88/06 |
| 2014/0092844 A1 | 4/2014 | Xiao et al. | |
| 2014/0094188 A1* | 4/2014 | Kazmi et al. | H04W 4/023 |
| 2014/0349677 A1 | 11/2014 | Xiao et al. | |
| 2015/0365790 A1* | 12/2015 | Edge et al. | H04W 4/02 |
| 2016/0100290 A1* | 4/2016 | Smith | H04W 4/023 |
| 2017/0257741 A1* | 9/2017 | Kim | H04W 4/023 |
| 2018/0041984 A1* | 2/2018 | Li et al. | H04W 64/00 |
| 2018/0132061 A1 | 5/2018 | Bitra et al. | |
| 2018/0167775 A1 | 6/2018 | Tian et al. | |
| 2019/0074946 A1 | 3/2019 | Xue et al. | |
| 2019/0182665 A1* | 6/2019 | Edge | H04W 12/02 |
| 2020/0021946 A1* | 1/2020 | Kumar et al. | H04W 4/029 |
| 2020/0053690 A1* | 2/2020 | Fischer et al. | H04W 64/003 |

FOREIGN PATENT DOCUMENTS

| | | | |
|---|---|---|---|
| CN | 103068012 A | 4/2013 | |
| CN | 106304328 A | 1/2017 | |
| CN | 107770810 A | 3/2018 | |
| EP | 3448099 A1 | 5/2016 | |
| EP | 3544340 A1 | 9/2017 | |
| JP | 2011024037 A | 2/2011 | |
| WO | 2015138178 A1 | 9/2015 | |
| WO | 2017190274 A1 | 11/2017 | |
| WO | 2017194675 A1 | 11/2017 | |
| WO | 2018090697 A1 | 5/2018 | |
| WO | 2018127137 A1 | 7/2018 | |

OTHER PUBLICATIONS

Positioning Method, Positioning Server, Terminal, and Base Station; EP 2797347 A1; Published to Dengkun (Year: 2014).*
Positioning By Mobile Communication System; JP 2015523746 A (Year: 2015).*
Ensure The Location Quality Of Service During The Cell Change; CN 104322120 A; Published to Siomina (Year: 2015).*
First Office Action for Japanese Patent Application 2021-512616, dated Apr. 19, 2022, and English translation provided by Global Dossier.
"Dynamic activation of PRS," 3GPP TSG-RAN WG2 Meeting #67bis, R2-095857, Miyasaki, Japan, Oct. 12-16, 2009.
First Office Action and search report from CN app. No. 201811031438.0, dated Sep. 3, 2021, with English translation from Global Dossier, all pages.
Extended European Search Report from EP app. No. 19856595.4, dated Oct. 6, 2021, all pages.
Ericsson, "On the remaining details of NR Release 15 positioning support", R2-1803456, 3GPP TSG-RAN WG2 Meeting #101, Athens, Greece, Feb. 26-Mar. 2, 2018, all pages.
Ericsson, "On timing reference configuration for NR device support of E-UTRAN OTDOA", R2-1805264, 3GPP TSG-RAN WG2#101bis, Sanya, China, 16th-20th Apr. 16-20, 2018, all pages.
Huawei, HiSilicon, "Timing for LTE OTDOA measurements", R1-1807981, 3GPP TSG-RAN WG2 #102, Busan, Korea, May 21-25, 2018, all pages.
International Search Report from PCT/CN2019/103629, dated Nov. 26, 2019, with English translation from WIPO, all pages.
Written Opinion from the International Searching Authority from PCT/CN2019/103629, dated Nov. 26, 2019, with English translation from WIPO, all pages.
International Preliminary Report on Patentability from PCT/CN2019/103629, dated Mar. 9, 2021, with English translation from WIPO, all pages.
First Office Action for the corresponding Korean Patent Application 10-2021-7009853, dated Apr. 25, 2023 and its English translation provided by the Korean Patent Office.
"On PRS-based Terrestrial Beacon System (TBS) and same PCI," 3GPP TSG-RAN WG2 #95bis, Tdoc R2-166674, Kaohsiung, Taiwan, Oct. 10-14, 2016, Agenda Item: 8.7.1, Source: Ericsson, all pages.
"Introduction of support for PRS configurations based on PRS ID and PRS-based TBS," 3GPP TSG-RAN WG2 Meeting #95bis, R2-166675, Kaohsiung, Taiwan, Oct. 10-14, 2016, Source WG: Ericsson, Source TSG: R2, all pages.

* cited by examiner

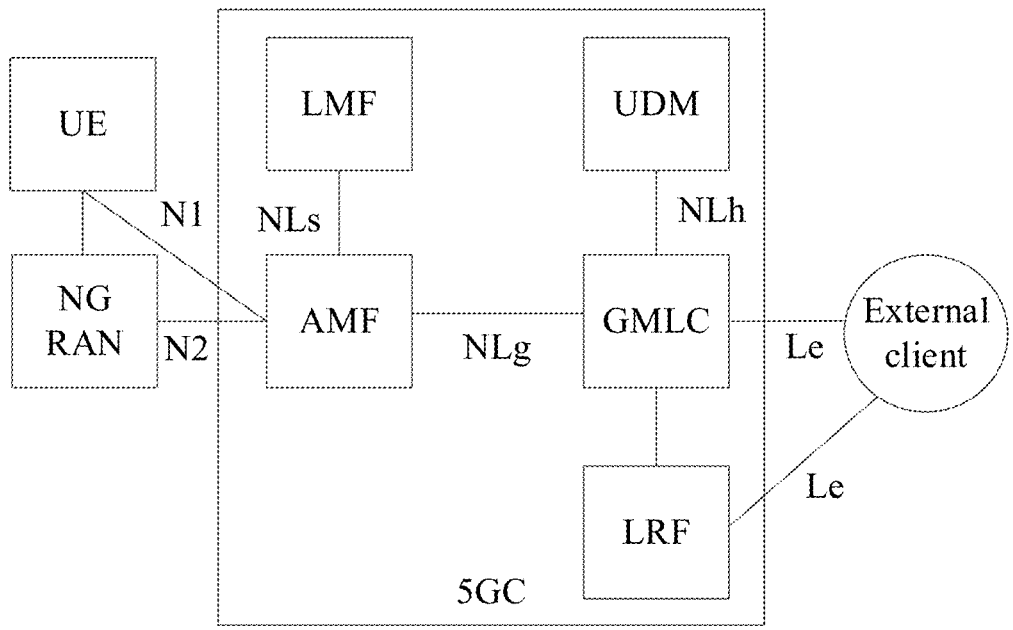

Fig. 3

| sending location resource coordination information to a base station before performing location measurement for a serving UE, wherein the location resource coordination information includes identity information of a target cell of the base station, and carries dedicated location resource information configured for the target cell, or the location resource coordination information includes the identity information of a target cell for which the base station activates the location resource, and instructs the base station to activate pre-configured dedicated location resource information | 41 |

Fig. 4

NETWORK NODE, USER EQUIPMENT AND BASE STATION USED IN A COMMUNICATION SYSTEM AND METHOD FOR LOCATION RESOURCE COORDINATION

CROSS-REFERENCE TO RELATED APPLICATIONS

The present application is the U.S. national phase of PCT Application No. PCT/CN2019/103629 filed on Aug. 30, 2019, which claims a priority of the Chinese patent application No. 201811031438.0 filed on Sep. 5, 2018, the disclosures of which are incorporated herein by reference in their entireties.

TECHNICAL FIELD

The present disclosure relates to the field of communication technology, in particular to a location resource coordinating method, a location resource coordinating device, a network node, a user equipment (UE) and a base station.

BACKGROUND

Location Based Services (LBS) is a service that obtains UE location information through wireless communication networks or other location systems, and then combines various location-related information provided by geographic information systems to users. Outdoor location technology based on the Global Navigation Satellite System (GNSS) has been widely used in various fields. In addition, the high-precision location technology based on the 4G mobile communication network has also effectively filled the gap in the location of the satellite navigation system. The mobile communication network has entered the era of 5G technology, so it is necessary to study a more concise and efficient 5G location network architecture. Compared with the 4G LTE (long-term evolution) architecture, this 5G location network architecture should have location demand of higher precision and lower latency.

(1) 5G Mobile Communication System

In the 5G system, most of the nodes on the network side are wiredly connected, that is, the gNBs (NR NodeB, 5G base station) are connected to each other through a wired link, and the gNB and the core network node, such as Access and Mobility Management Function (AMF), User Plane Function (UPF), etc., are connected by a wired link.

Ng-eNB (4G base station node that can access core network 5GC): node providing E-UTRA user plane and control plane protocol terminations towards the UE, and connected via the NG interface to the 5GC. Specifically, as shown in FIG. 1, Xn represents an Xn interface, NG represents an NG interface, and NG-RAN represents a radio access network.

(2) 5G Wireless Protocol Architecture

The 5G basic user plane protocol layer includes service discovery application specification layer SDAP, packet data convergence protocol layer PDCP, radio link layer RLC and medium access control layer MAC, and physical layer PHY. The control plane protocol layer includes non-access layer NAS, radio resource control layer RRC, PDCP, RLC, MAC and PHY. Specifically, the protocol stack architecture of the user plane and the control plane is shown in FIG. 2.

(3) A 5G Location Network Architecture

As shown in FIG. 3, it shows a service-based location service network architecture, where location management function entity (LMF) has the following functions: supporting location calculation, obtaining downlink location measurement results or location estimates from the UE, and obtaining uplink location measurement results from the Radio Access Network (RAN) side, and obtaining auxiliary data from the RAN side. In the drawing, N1 represents the N1 interface (also can be understood as the logical interface between the UE and AMF), N2 represents the N2 interface, NLs represents the NLs interface, NLg represents the NLg interface, NLh represents the NLh interface, Le represents the Le interface, and UDM represents the unified data management entity, GMLC represents the gateway mobile location center entity, LRF represents the location acquisition function entity, and External Client represents the external client.

However, in related 4G or 5G network location technologies, there is no dynamic coordination mechanism for location resources, which causes additional signal interference by redundant location resources to other network units, and also wastes valuable wireless resources.

SUMMARY

The present disclosure provides a location resource coordinating method, a location resource coordinating device, a network node, a UE, and a base station, so as to solve the problem in the related art that additional signal interference caused by redundant location resource to other network units.

In order to solve the above technical problem, a location resource coordinating method is applied to a network node, the network node being a local location management function entity or a location management function entity, wherein the location resource coordinating method includes: sending location resource coordination information to a base station before performing location measurement for a serving user equipment (UE); wherein the location resource coordination information includes identity information of a target cell of the base station, and carries dedicated location resource information configured for the target cell, or the location resource coordination information includes the identity information of a target cell for which the base station activates a location resource, and instructs the base station to activate pre-configured dedicated location resource information; the base station is a base station related to the serving UE.

Optionally, dedicated location resource information configured for the target cell includes at least one of the following information: bandwidth information of a positioning reference symbol (PRS); PRS index information; cyclic prefix (CP) length information; a quantity of continuous downlink (DL) subframes; a quantity of ports.

Optionally, the dedicated location resource information further includes effective time information.

Optionally, the effective time information is indicated in a form of a system frame number (SFN).

Optionally, after sending the location resource coordination information to the base station, the location resource coordinating method further includes: receiving a first configuration success response message fed back by the base station; and triggering a corresponding downlink location measurement process after completing a minimum configuration set of required location resources, wherein the first configuration success response message is a message that the configuration is successful for all or part of target points.

Optionally, if the location resource coordination information instructs the base station to activate pre-configured dedicated location resource information, the first configuration success response message comprises at least one of the following information: bandwidth information of a PRS; PRS index information; CP length information; a quantity of consecutive DL subframes; a quantity of ports.

Optionally, the sending the location resource coordination information to the base station includes: transferring the location resource coordination information in a form of an LPPa data packet through an access and mobility management function entity (AMF), and transmitting the location resource coordination information to the base station through an N2 interface.

Optionally, after the location resource coordination information is sent to the base station, the location resource coordinating method further includes: sending location resource update information to the base station before updating a location measurement resource or a measurement signal source for the serving UE; wherein the location resource update information includes identity information of a target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes identity information of a newly added target cell for which that the base station activates the location resource, and instructs the base station to activate corresponding pre-configured dedicated location resource information; or the location resource update information includes the identity information of the target cell for which the base station changes the location resource, and instructs the base station to activate the corresponding pre-configured dedicated location resource information; the base station is a base station related to the service UE.

Optionally, the dedicated location resource information configured for the target cell newly added by the base station, and/or the dedicated location resource information updated for the target cell for which the base station changes the location resource, includes at least one of the following information: bandwidth information of PRS; PRS index information; CP length information; a quantity of continuous DL subframes; a quantity of ports.

Optionally, the location resource update information further includes effective time information.

Optionally, the effective time information is indicated in a form of a system frame number (SFN).

Optionally, after sending the location resource update information to the base station, the location resource coordinating method further includes: receiving a second configuration success response message fed back by the base station; and triggering a corresponding downlink location measurement process after completing a minimum configuration set of required location resources, wherein the second configuration success response message is a message that the configuration is successful for all or part of target points.

Optionally, if the location resource update information instructs the base station to activate the corresponding pre-configured dedicated location resource information, the second configuration success response message includes at least one of the following information: bandwidth information of a PRS; PRS index information; CP length information; a quantity of continuous DL subframes; a quantity of ports.

Optionally, the sending location resource update information to the base station includes: transferring the location resource update information in the form of an LPPa data packet through an access and mobility management function entity (AMF), and transmitting the location resource update information to the base station through an N2 interface.

Optionally, after sending location resource coordination information to the base station, the location resource coordinating method further includes: sending location resource release information to the base station; receiving a resource release success message fed back by the base station; wherein the location resource release information includes identity information of a target cell for which the base station releases the location resource, the resource release success message is a message that the resource is successfully released for all or part of target points.

Optionally, the sending the location resource release information to the base station includes: transferring the location resource release information in a form of an LPPa data packet through an access and mobility management function entity (AMF), and transmitting the location resource release information to the base station through an N2 interface.

Optionally, after sending the location resource coordination information to the base station, the location resource coordinating method further includes: receiving the location resource coordination information sent by the base station; and feeding back a coordination success response message to the base station according to positioning requirements, wherein the location resource coordination information includes identity information of a target cell for which the base station updates the location resource and corresponding recommended dedicated location resource information; or the location resource coordination information includes identity information of a target cell for which the base station releases the location resource; the coordination success response message is a message that the coordination is successful for all or part of target points.

Optionally, the receiving the location resource coordination information sent by the base station includes: receiving the location resource coordination information transferred by the access and mobility management function entity (AMF) in the form of LPPa data packets sent by the base station.

Optionally, the recommended dedicated location resource information comprises at least one of the following information: bandwidth information of a PRS; PRS index information; CP length information; a quantity of consecutive DL subframes; a quantity of ports.

Optionally, after sending the location resource coordination information to the base station, the location resource coordinating method further includes: using the changed location resource information to form a corresponding peer layers positioning protocol LPP message, the LPP message carrying updated location resource configuration information, and/or deleted location resource configuration information; and sending the LPP message to a UE that has a positioning requirement.

An embodiment of the present disclosure further provides a location resource coordinating method, applied to a UE, including: receiving a peer layers positioning protocol LPP message sent by a network node; changing location configuration information according to the LPP message; wherein the LPP message carries updated location resource configuration information, and/or deleted location resource configuration information, the network node is a local location management function entity or a location management function entity.

Optionally, the changing the location configuration information according to the LPP message includes: storing the latest location configuration information according to the location resource configuration information updated in the LPP message; and/or removing the corresponding location configuration information according to the location resource configuration information deleted in the LPP message.

An embodiment of the present disclosure further provides a location resource coordinating method, applied to a base station, including: receiving location resource coordination information sent by a network node; the network node is a local location management function entity or a location management function entity; configuring and activating corresponding dedicated location resources according to the location resource coordination information; wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

Optionally, the dedicated location resource information configured for the target cell includes at least one of the following information: bandwidth information of a PRS; PRS index information; CP length information; a quantity of continuous DL subframes; a quantity of ports.

Optionally, the dedicated location resource information also includes effective time information; the configuring and activating the corresponding location dedicated resource according to the location resource coordination information includes: configuring corresponding dedicated location resource according to the location resource coordination information and activating the corresponding dedicated location resources at a corresponding time point.

Optionally, the effective time information is indicated in a form of a system frame number (SFN).

Optionally, after configuring and activating corresponding dedicated location resources according to the location resource coordination information, the location resource coordinating method further includes: feeding back a first configuration success response message to the network node; wherein the first configuration success response message is a message that the configuration is successful for all or part of the target points.

Optionally, if the location resource coordination information instructs the base station to activate pre-configured dedicated location resource information, the first configuration success response message includes at least one of the following information: bandwidth information of a PRS; PRS index information; CP length information; a quantity of consecutive DL subframes; a quantity of ports.

Optionally, the receiving the location resource coordination information sent by the network node includes: receiving the location resource coordination information that is sent by the network node in a form of an LPPa data packet, transferred through an access and mobility management function entity (AMF), and sent through an N2 interface.

Optionally, after receiving the location resource coordination information sent by the network node, the location resource coordinating method further includes: receiving location resource update information sent by the network node; and configuring and activating a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

Optionally, the dedicated location resource information configured for the target cell newly added by the base station, and/or the dedicated location resource information updated for the target cell for which the base station changes the location resource, includes at least one of the following information: bandwidth information of PRS; PRS index information; CP length information; a quantity of continuous DL subframes; a quantity of ports.

Optionally, the location resource update information further includes effective time information; the configuring and activating a corresponding update process according to the location resource update information includes: configuring a corresponding update process according to the location resource update information and activating the corresponding update process at a corresponding time point.

Optionally, the effective time information is indicated in a form of a system frame number (SFN).

Optionally, after receiving the location resource update information sent by the network node, the location resource coordinating method further includes: feeding back a second configuration success response message to the network node; wherein the second configuration success response message is a message that the configuration is successful for all or part of the target points.

Optionally, if the location resource update information instructs the base station to activate the corresponding pre-configured dedicated location resource information, the second configuration success response message includes at least one of the following information: bandwidth information of a PRS; PRS index information; CP length information; a quantity of continuous DL subframes; a quantity of ports.

Optionally, the receiving location resource update information sent by the network node includes: receiving the location resource update information that is sent by the network node in the form of LPPa data packet, transferred through the access and mobility management function entity AMF, and sent by an N2 interface.

Optionally, after receiving the location resource coordination information sent by the network node, the location resource coordinating method further includes: receiving location resource release information sent by the network node; and releasing corresponding dedicated location resource information according to the location resource release information; feeding back a resource release success message to the network node; wherein the location resource release information includes the identity information of the target cell for which the base station releases the location resource; the resource release success message is a message that the resource is successfully released for all or part of the target points.

Optionally, the receiving the location resource release information sent by the network node includes: receiving the location resource release information that is sent by the network node in the form of an LPPa data packet, transferred through an access and mobility management function entity AMF, and sent through an N2 interface.

Optionally, after receiving the location resource coordination information sent by the network node, the location resource coordinating method further includes: based on radio resource management RRM requirements, when there is a need to change the location resource of a target point, sending location resource coordination information to a network node; receiving a coordination success response message fed back by the network node; wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Optionally, the sending location resource coordination information to the network node includes: sending the location resource coordination information to the network node in the form of an LPPa data packet through the access and mobility management function entity (AMF).

Optionally, the recommended dedicated location resource information includes at least one of the following information: bandwidth information of a PRS; PRS index information; CP length information; a quantity of consecutive DL subframes; a quantity of used ports.

An embodiment of the present disclosure provides a network node, wherein the network node is a local location management function entity or a location management function entity, and comprises a memory, a processor, a transceiver, and a computer program stored on the memory and executed by the processor, when the processor executes the program, the following steps are implemented: sending location resource coordination information to a base station before performing location measurement for a serving UE; wherein the location resource coordination information includes identity information of a target cell of the base station, and carries dedicated location resource information configured for the target cell, or the location resource coordination information includes the identity information of a target cell for which the base station activates a location resource, and instructs the base station to activate pre-configured dedicated location resource information; the base station is a base station related to the serving UE.

Optionally, dedicated location resource information configured for the target cell includes at least one of the following information: bandwidth information of a positioning reference symbol (PRS); PRS index information; cyclic prefix (CP) length information; a quantity of continuous downlink (DL) subframes; a quantity of ports.

Optionally, the dedicated location resource information further includes effective time information.

Optionally, the effective time information is indicated in a form of a system frame number (SFN).

Optionally, the processor is further configured to: after sending the location resource coordination information to the base station, receive a first configuration success response message fed back by the base station through the transceiver; and trigger a corresponding downlink location measurement process after completing a minimum configuration set of required location resources, wherein the first configuration success response message is a message that the configuration is successful for all or part of target points.

Optionally, if the location resource coordination information instructs the base station to activate pre-configured dedicated location resource information, the first configuration success response message comprises at least one of the following information: bandwidth information of a PRS; PRS index information; CP length information; a quantity of consecutive DL subframes; a quantity of ports.

Optionally, the processor is specifically configured to: transfer the location resource coordination information in a form of an LPPa data packet through an access and mobility management function entity (AMF), and transmitting the location resource coordination information to the base station through an N2 interface through the transceiver.

Optionally, the processor is further configured to: after the location resource coordination information is sent to the base station, send location resource update information to the base station through the transceiver before updating a location measurement resource or a measurement signal source for the serving UE; wherein the location resource update information includes identity information of a target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes identity information of a newly added target cell for which that the base station activates the location resource, and instructs the base station to activate corresponding pre-configured dedicated location resource information; or the location resource update information includes the identity information of the target cell for which the base station changes the location resource, and instructs the base station to activate the corresponding pre-configured dedicated location resource information; the base station is a base station related to the service UE.

Optionally, the dedicated location resource information configured for the target cell newly added by the base station, and/or the dedicated location resource information updated for the target cell for which the base station changes the location resource, includes at least one of the following information: bandwidth information of PRS; PRS index information; CP length information; a quantity of continuous DL subframes; a quantity of ports.

Optionally, the location resource update information further includes effective time information.

Optionally, the effective time information is indicated in a form of a system frame number (SFN).

Optionally, the processor is further configured to: after sending the location resource update information to the base station, receive a second configuration success response message fed back by the base station through the transceiver; and trigger a corresponding downlink location measurement process after completing a minimum configuration set of required location resources, wherein the second configuration success response message is a message that the configuration is successful for all or part of target points.

Optionally, if the location resource update information instructs the base station to activate the corresponding pre-configured dedicated location resource information, the second configuration success response message includes at least one of the following information: bandwidth information of a PRS; PRS index information; CP length information; a quantity of continuous DL subframes; a quantity of ports.

Optionally, the processor is specifically configured to: transferring the location resource update information in the form of an LPPa data packet through an access and mobility management function entity (AMF), and transmitting the location resource update information to the base station through an N2 interface through the transceiver.

Optionally, the processor is further configured to: after sending location resource coordination information to the base station, send location resource release information to the base station, and receive a resource release success message fed back by the base station through the transceiver; wherein the location resource release information includes identity information of a target cell for which the base station releases the location resource, the resource release success message is a message that the resource is successfully released for all or part of target points.

Optionally, the processor is specifically configured to: transfer the location resource release information in a form of an LPPa data packet through an access and mobility management function entity (AMF), and transmit the location resource release information to the base station through an N2 interface through the transceiver.

Optionally, the processor is further configured to: after sending the location resource coordination information to the base station, receive the location resource coordination information sent by the base station through the transceiver; and feed back a coordination success response message to the base station according to positioning requirements, wherein the location resource coordination information includes identity information of a target cell for which the base station updates the location resource and corresponding recommended dedicated location resource information; or the location resource coordination information includes identity information of a target cell for which the base station releases the location resource; the coordination success response message is a message that the coordination is successful for all or part of target points.

Optionally, the processor is specifically configured to: Receive the location resource coordination information transferred by the access and mobility management function entity (AMF) in the form of LPPa data packets sent by the base station through the transceiver.

Optionally, the recommended dedicated location resource information comprises at least one of the following information: bandwidth information of a PRS; PRS index information; CP length information; a quantity of consecutive DL subframes; a quantity of ports.

Optionally, the processor is further configured to: after sending the location resource coordination information to the base station, use the changed location resource information to form a corresponding peer layers positioning protocol LPP message, the LPP message carrying updated location resource configuration information, and/or deleted location resource configuration information; and send the LPP message to a UE that has a positioning requirement through the transceiver.

An embodiment of the present disclosure provides a user equipment, comprising a memory, a processor, a transceiver, and a computer program stored on the memory and executed by the processor; wherein when the processor executes the program, the following steps are implemented: receive a peer layers positioning protocol LPP message sent by a network node through the transceiver; change location configuration information according to the LPP message; wherein the LPP message carries updated location resource configuration information, and/or deleted location resource configuration information, the network node is a local location management function entity or a location management function entity.

Optionally, the processor is specifically configured to: store the latest location configuration information according to the location resource configuration information updated in the LPP message; and/or remove the corresponding location configuration information according to the location resource configuration information deleted in the LPP message.

An embodiment of the present disclosure provides a base station, comprising a memory, a processor, a transceiver, and a computer program stored on the memory and executed by the processor; wherein when the processor executes the program, the following steps are implemented: receive location resource coordination information sent by a network node through the transceiver; the network node is a local location management function entity or a location management function entity; configure and activate corresponding dedicated location resources according to the location resource coordination information; wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

Optionally, the dedicated location resource information configured for the target cell includes at least one of the following information: bandwidth information of a PRS; PRS index information; CP length information; a quantity of continuous DL subframes; a quantity of ports.

Optionally, the dedicated location resource information further includes effective time information; the processor is specifically configured to: configure corresponding dedicated location resource according to the location resource coordination information and activate the corresponding dedicated location resources at a corresponding time point.

Optionally, the effective time information is indicated in a form of a system frame number (SFN).

Optionally, the processor is further configured to: after configuring and activating corresponding dedicated location resources according to the location resource coordination information, feed back a first configuration success response message to the network node through the transceiver; wherein the first configuration success response message is a message that the configuration is successful for all or part of the target points.

Optionally, if the location resource coordination information instructs the base station to activate pre-configured dedicated location resource information, the first configuration success response message includes at least one of the following information: bandwidth information of a PRS;

PRS index information; CP length information; a quantity of consecutive DL subframes; a quantity of ports.

Optionally, the processor is specifically configured to: receive the location resource coordination information that is sent by the network node in a form of an LPPa data packet, transferred through an access and mobility management function entity (AMF), and sent through an N2 interface.

Optionally, the processor is further configured to: after receiving the location resource coordination information sent by the network node, receive location resource update information sent by the network node through the transceiver; and configure and activate a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

Optionally, the dedicated location resource information configured for the target cell newly added by the base station, and/or the dedicated location resource information updated for the target cell for which the base station changes the location resource, includes at least one of the following information: bandwidth information of PRS; PRS index information; CP length information; a quantity of continuous DL subframes; a quantity of ports.

Optionally, the location resource update information further includes effective time information; the processor is specifically configured to: configure a corresponding update process according to the location resource update information and activate the corresponding update process at a corresponding time point.

Optionally, the effective time information is indicated in a form of a system frame number (SFN).

Optionally, the processor is further configured to: after receiving the location resource update information sent by the network node, feed back a second configuration success response message to the network node through the transceiver; wherein the second configuration success response message is a message that the configuration is successful for all or part of the target points.

Optionally, if the location resource update information instructs the base station to activate the corresponding pre-configured dedicated location resource information, the second configuration success response message includes at least one of the following information: bandwidth information of a PRS; PRS index information; CP length information; a quantity of continuous DL subframes; a quantity of ports.

Optionally, the processor is specifically configured to: receive the location resource update information that is sent by the network node in the form of LPPa data packet, transferred through the access and mobility management function entity AMF, and sent by an N2 interface.

Optionally, the processor is further configured to: after receiving the location resource coordination information sent by the network node, receive location resource release information sent by the network node through the transceiver; and release corresponding dedicated location resource information according to the location resource release information; feed back a resource release success message to the network node; wherein the location resource release information includes the identity information of the target cell for which the base station releases the location resource; the resource release success message is a message that the resource is successfully released for all or part of the target points.

Optionally, the processor is specifically configured to: receive the location resource release information that is sent by the network node in the form of an LPPa data packet, transferred through an access and mobility management function entity AMF, and sent through an N2 interface.

Optionally, the processor is further configured to: after receiving the location resource coordination information sent by the network node, based on radio resource management RRM requirements, when there is a need to change the location resource of a target point, send location resource coordination information to a network node; and receive a coordination success response message fed back by the network node through the transceiver; wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Optionally, the processor is specifically configured to: send the location resource coordination information to the network node in the form of an LPPa data packet through the access and mobility management function entity (AMF).

Optionally, the recommended dedicated location resource information includes at least one of the following information: bandwidth information of a PRS; PRS index information; CP length information; a quantity of consecutive DL subframes; a quantity of used ports.

An embodiment of the present disclosure provides a computer-readable storage medium on which a computer program is stored, wherein when the program is executed by a processor, the steps of the location resource coordinating method are implemented.

An embodiment of the present disclosure provides a location resource coordinating device, applied to a network node, the network node being a local location management function entity or a location management function entity; wherein the location resource coordination device includes: a first sending module, configured to send location resource coordination information to a base station before performing location measurement for a serving UE; wherein the location resource coordination information includes identity information of a target cell of the base station, and carries dedicated location resource information configured for the target cell, or the location resource coordination information includes the identity information of a target cell for which the base station activates a location resource, and instructs the base station to activate pre-configured dedicated location resource information; the base station is a base station related to the serving UE.

Optionally, the dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Optionally, the dedicated location resource information also includes effective time information thereof.

Optionally, the effective time information is indicated in the form of a system frame number SFN.

Optionally, the location resource coordination device further includes: a first receiving module, configured to receive a first configuration success response message fed back by the base station; and a first trigger module, configured to trigger a corresponding downlink location measurement process after completing a minimum configuration set of required location resources; wherein the first configuration success response message is a message that the configuration is successful for all or part of the target points.

Optionally, if the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Optionally, the first sending module includes: a first sending sub-module, configured to transfer the location resource coordination information in the form of an LPPa data packet through an access and mobility management function entity AMF, and then transmit the same to the base station through an N2 interface.

Optionally, the location resource coordination device further includes: a second sending module, configured to, after the location resource coordination information is sent to the base station, send location resource update information to the base station before updating a location measurement resource or a measurement signal source for the serving UE; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information; or the base station is a base station related to the service UE.

Optionally, the dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Optionally, the location resource update information also includes effective time information thereof.

Optionally, the effective time information is indicated in the form of a system frame number SFN.

Optionally, the location resource coordination device further includes: a second receiving module, configured to receive a second configuration success response message fed back by the base station after sending location resource update information to the base station; and a second trigger module, configured to trigger a corresponding downlink location measurement process after completing a minimum configuration set of required location resources; wherein the second configuration success response message is a message that the configuration is successful for all or part of the target points.

Optionally, if the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Optionally, the second sending module includes: a second sending sub-module, configured to transfer the location resource update information in the form of LPPa data packet through an access and mobility management function entity AMF, and then transmitting the same to the base station through an N2 interface.

Optionally, the location resource coordination device further includes: a third sending module, configured to send location resource release information to the base station after sending location resource coordination information to the base station; and a third receiving module, configured to receive a resource release success message fed back by the base station; wherein the location resource release information includes the identity information of a target cell for which the base station releases the location resource; the resource release success message is a message that the resource is successfully released for all or part of the target points.

Optionally, the third sending module includes: a third sending sub-module, which is used to transfer the location resource release information in the form of an LPPa data packet through an access and mobility management function entity AMF, and transmit the same to the base station through an N2 interface.

Optionally, the location resource coordination device further includes: a fourth receiving module, configured to receive the location resource coordination information sent by the base station after sending the location resource coordination information to the base station; and the first feedback module, configured to feed back a coordination success response message to the base station according to the location requirements, wherein the location resource coordination information includes the identity information of the target cell for which the base station updates the location resource and corresponding recommended dedicated location resource information; or the location resource coordination information includes the identity information of the target cell for which the base station releases the location resource; the coordination success response message is a message that the coordination is successful for all or part of the target points.

Optionally, the fourth receiving module includes: a first receiving sub-module, configured to receive the location resource coordination information transferred by the access and mobility management function entity AMF in the form of LPPa data packets sent by the base station.

Optionally, the recommended dedicated location resource information includes at least one of the following information: bandwidth information of a positioning reference symbol PRS; PRS index information; cyclic prefix CP length information; a quantity of consecutive downlink DL subframes; a quantity of used ports.

Optionally, the location resource coordination device further includes: a first processing module, configured to use the changed location resource information to form a corresponding peer layers positioning protocol LPP message, the LPP message carries updated location resource configuration information, and/or deleted location resource configuration information; and send the LPP message to a UE that has a positioning requirement.

An embodiment of the present disclosure also provides a location resource coordinating device, which is applied to a UE, including: a fifth receiving module 111, configured to receive a peer layers positioning protocol LPP message sent by a network node; and a second processing module 112, configured to change location configuration information according to the LPP message.

Optionally, the LPP message carries updated location resource configuration information, and/or deleted location resource configuration information. The network node is a local location management function entity or a location management function entity.

Optionally, the second processing module includes: a first processing sub-module, configured to store the latest location configuration information according to the location resource configuration information updated in the LPP message; and/or removing the corresponding location configuration information according to the location resource configuration information deleted in the LPP message.

An embodiment of the present disclosure also provides a location resource coordinating device, which is applied to a base station, including: a sixth receiving module, configured to receive location resource coordination information sent by a network node; the network node is a local location management function entity or a location management function entity; a third processing module, configured to configure and activate corresponding dedicated location resources according to the location resource coordination information.

Optionally, the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

Optionally, the dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Optionally, the dedicated location resource information also includes its own effective time information; the third processing module includes: a second processing sub-module, configured to configure corresponding dedicated location resource according to the location resource coordination information and activate the corresponding dedicated location resources at a corresponding time point.

Optionally, the effective time information is indicated in the form of a system frame number SFN.

Optionally, the location resource coordination device further includes: a second feedback module, configured to feed back a first configuration success response to the network node after configuring and activating corresponding dedicated location resources according to the location resource coordination information; wherein, the first configuration success response message is a message that the configuration is successful for all or part of the target points.

Optionally, if the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Optionally, the sixth receiving module includes: a second receiving sub-module, configured to receive the location resource coordination information that is sent by the network node in the form of an LPPa data packet, transferred through an access and mobility management function entity AMF, and sent through an N2 interface.

Optionally, the location resource coordination device further includes: a seventh receiving module, configured to receive location resource update information sent by the network node after receiving the location resource coordination information sent by the network node; a fourth processing module, configured to configure and activate a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

Optionally, the dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Optionally, the location resource update information also includes its own effective time information; the fourth processing module includes: a third processing sub-module, configured to configure a corresponding update process according to the location resource update information and activate the corresponding update process at a corresponding time point.

Optionally, the effective time information is indicated in the form of a system frame number SFN.

Optionally, the location resource coordination device further includes: a third feedback module, configured to feed back a second configuration success response message to the network node; wherein the second configuration success response message is a message that the configuration is successful for all or part of the target points.

Optionally, if the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Optionally, the seventh receiving module includes: a third receiving sub-module, configured to receive the location resource update information that is sent by the network node in the form of LPPa data packet, transferred through the access and mobility management function entity AMF, and sent by the N2 interface.

Optionally, the location resource coordination device further includes: an eighth receiving module, configured to receive location resource release information sent by the network node after receiving the location resource coordination information sent by the network node; a fifth processing module, configured to release corresponding dedicated location resource information according to the location resource release information; feed back a resource release success message to the network node; wherein the location resource release information includes the identity information of the target cell for which the base station releases the location resource; the resource release success message is a message that the resource is successfully released for all or part of the target points.

Optionally, the eighth receiving module includes: a fourth receiving sub-module, configured to receive the location resource release information that is sent by the network node in the form of an LPPa data packet, transferred through an access and mobility management function entity AMF, and sent through an N2 interface.

Optionally, the location resource coordination device further includes: a fifth sending module, configured to, after receiving the location resource coordination information sent by the network node, based on radio resource management RRM requirements, when there is a need to change the location resource of a target point, send location resource coordination information to a network node; receive a coordination success response message fed back by the network node; wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Optionally, the fifth sending module includes: a fourth sending sub-module, configured to send the location resource coordination information to the network node in the form of an LPPa data packet through the access and mobility management function entity AMF.

Optionally, the recommended dedicated location resource information includes at least one of the following information: bandwidth information of a positioning reference symbol PRS; PRS index information; cyclic prefix CP length information; a quantity of consecutive downlink DL subframes; a quantity of used ports.

The technical solutions of the present disclosure have the following beneficial effect.

The location resource coordinating method provided in the embodiment of the present disclosure sends location resource coordination information to the base station before performing location measurement for the serving UE; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information; the base station is a base station related to the service UE. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

BRIEF DESCRIPTION OF THE DRAWINGS

FIG. 3 is a schematic diagram of a 5G location network architecture in the related art;

FIG. 4 is a flow schematic diagram of a location resource coordinating method in an embodiment of the present disclosure;

DETAILED DESCRIPTION

Figure 1:
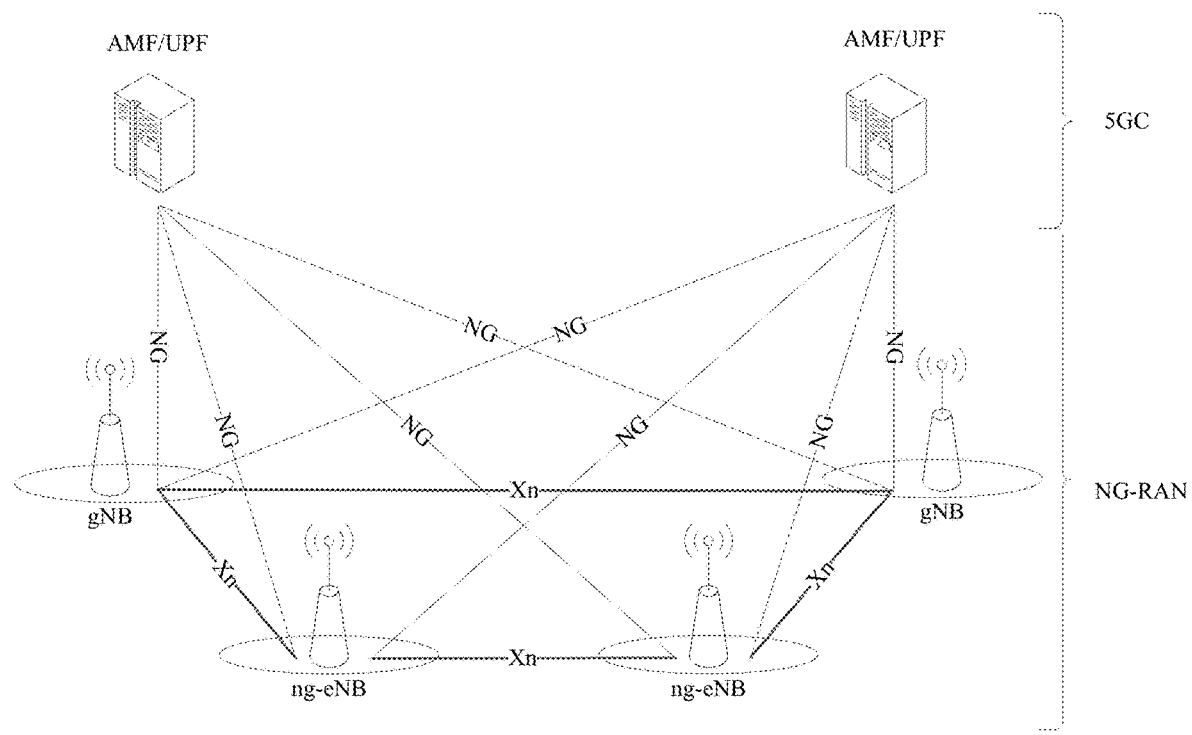
FIG. 1 is a schematic diagram of a 5G mobile communication system in the related art.
Figure 2:
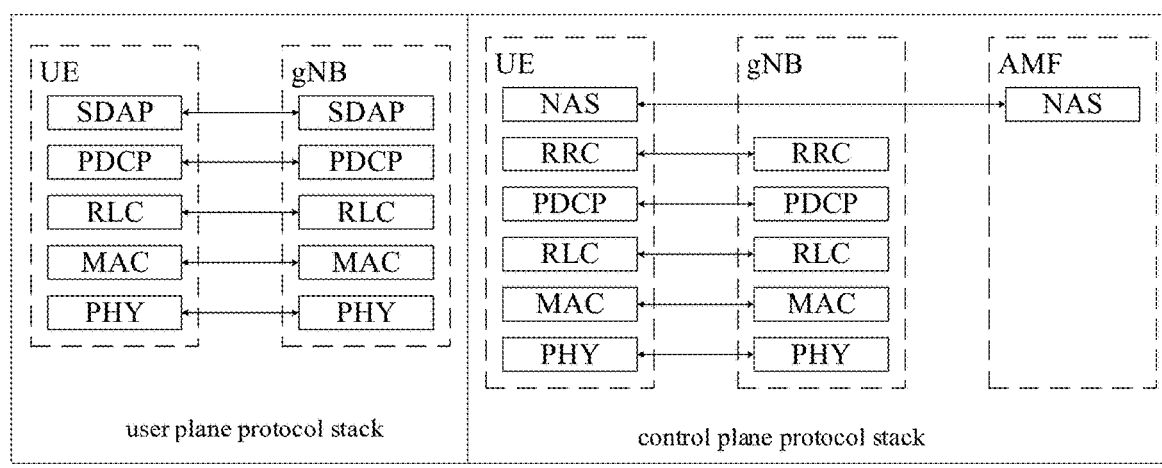
FIG. 2 is a schematic diagram of the 5G wireless protocol architecture in the related art.

In order to make the technical problems, technical solutions, and advantages to be solved by the present disclosure clearer, a detailed description will be given below with reference to the accompanying drawings and specific embodiments.

In view of the problem that redundant location resources in network locating process in the related art cause additional signal interference to other network units, the present disclosure provides a location resource coordinating method, which is applied to a network node, and the network node is a local location management function entity or a location management functional entity; as shown in FIG. 4, the location resource coordinating method includes the following steps.

Step 41: sending location resource coordination information to a base station before performing location measurement for a serving UE.

The location resource coordination information includes identity information of a target cell of the base station, and carries dedicated location resource information configured for the target cell, or the location resource coordination information includes the identity information of a target cell for which the base station activates the location resource, and instructs the base station to activate pre-configured dedicated location resource information.

The base station is a base station related to the serving UE.

The base station related to the service UE may include a base station adjacent to the network node.

The location resource coordinating method provided in the embodiment of the present disclosure sends location resource coordination information to the base station before performing location measurement for the serving UE; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information; the base station is a base station related to the service UE. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information also includes effective time information thereof.

Specifically, the effective time information is indicated in the form of a system frame number SFN.

Furthermore, after sending the location resource coordination information to the base station, the location resource coordinating method further includes: receiving a first configuration success response message fed back by the base station; and triggering a corresponding downlink location measurement process after completing a minimum configuration set of required location resources; wherein the first configuration success response message is a message that the configuration is successful for all or part of the target points.

If the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the sending the location resource coordination information to the base station includes: transferring the location resource coordination information in the form of an LPPa data packet through an access and mobility management function entity AMF, and then transmitting the same to the base station through an N2 interface.

The embodiment of the present disclosure further provides that, after the location resource coordination information is sent to the base station, the location resource coordinating method further includes: sending location resource update information to the base station before updating a location measurement resource or a measurement signal source for the serving UE; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information; or the base station is a base station related to the service UE.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information also includes effective time information thereof.

Specifically, the effective time information is indicated in the form of a system frame number SFN.

Furthermore, after sending the location resource update information to the base station, the location resource coordinating method further includes: receiving a second configuration success response message fed back by the base station; and triggering a corresponding downlink location measurement process after completing a minimum configuration set of required location resources; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the sending the location resource update information to the base station includes: transferring the location resource update information in the form of LPPa data packet through an access and mobility management function entity AMF, and then transmitting the same to the base station through an N2 interface.

The embodiment of the present disclosure further provides that, after sending location resource coordination information to the base station, the location resource coordinating method further includes: sending location resource release information to the base station; receiving a resource release success message fed back by the base station; wherein the location resource release information includes the identity information of a target cell for which the base station releases the location resource; the resource release success message is a message that the resource is successfully released for all or part of the target points.

Specifically, when the Local LMF (or LMF) completes the location service, the location resource release information may be sent to the base station.

The sending the location resource release information to the base station includes: transferring the location resource release information in the form of an LPPa data packet through an access and mobility management function entity AMF, and transmitting the same to the base station through an N2 interface.

The embodiment of the present disclosure further provides that, after sending the location resource coordination information to the base station, the location resource coordinating method further includes: receiving the location resource coordination information sent by the base station; and feeding back a coordination success response message to the base station according to the location requirements, wherein the location resource coordination information includes the identity information of the target cell for which the base station updates the location resource and corresponding recommended dedicated location resource information; or the location resource coordination information includes the identity information of the target cell for which the base station releases the location resource; the coordination success response message is a message that the coordination is successful for all or part of the target points.

Specifically, the receiving the location resource coordination information sent by the base station includes: receiving the location resource coordination information transferred by the access and mobility management function entity AMF in the form of LPPa data packets sent by the base station.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The embodiment of the present disclosure further provides that, after sending the location resource coordination information to the base station, the location resource coordinating method further includes: using the changed location resource information to form a corresponding peer layers positioning protocol LPP message, the LPP message carries updated location resource configuration information, and/or deleted location resource configuration information; and sending the LPP message to a UE that has a positioning requirement.

Figure 5:
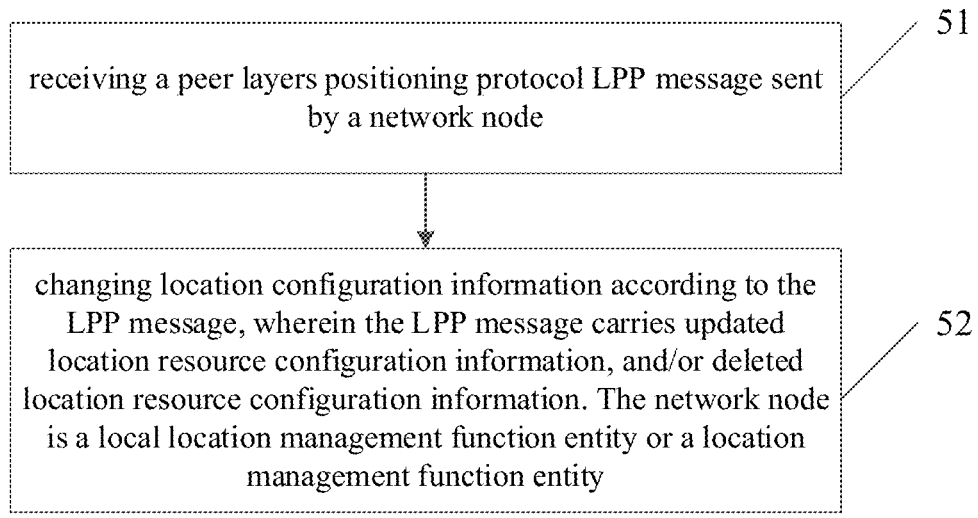
FIG. 5 is another flow schematic diagram of the location resource coordinating method in an embodiment of the present disclosure.

The embodiment of the present disclosure also provides a location resource coordinating method, which is applied to a UE, as shown in FIG. 5, including the following steps.

Step 51: receiving a peer layers positioning protocol LPP message sent by a network node;

Step 52: changing location configuration information according to the LPP message.

Wherein the LPP message carries updated location resource configuration information, and/or deleted location resource configuration information.

The network node is a local location management function entity or a location management function entity.

The location resource coordinating method provided by the embodiments of the present disclosure includes: receiving a peer layers positioning protocol LPP message sent by a network node; changing location configuration information according to the LPP message; wherein the LPP message carries updated location resource configuration information and/or, deleted location resource configuration information; the network node is a local location management function entity or a location management function entity. It may be avoided that the UE measures an error location signal, and can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

Specifically, the changing the location configuration information according to the LPP message includes: storing the latest location configuration information according to the location resource configuration information updated in the LPP message; and/or removing the corresponding location configuration information according to the location resource configuration information deleted in the LPP message.

Figure 6:
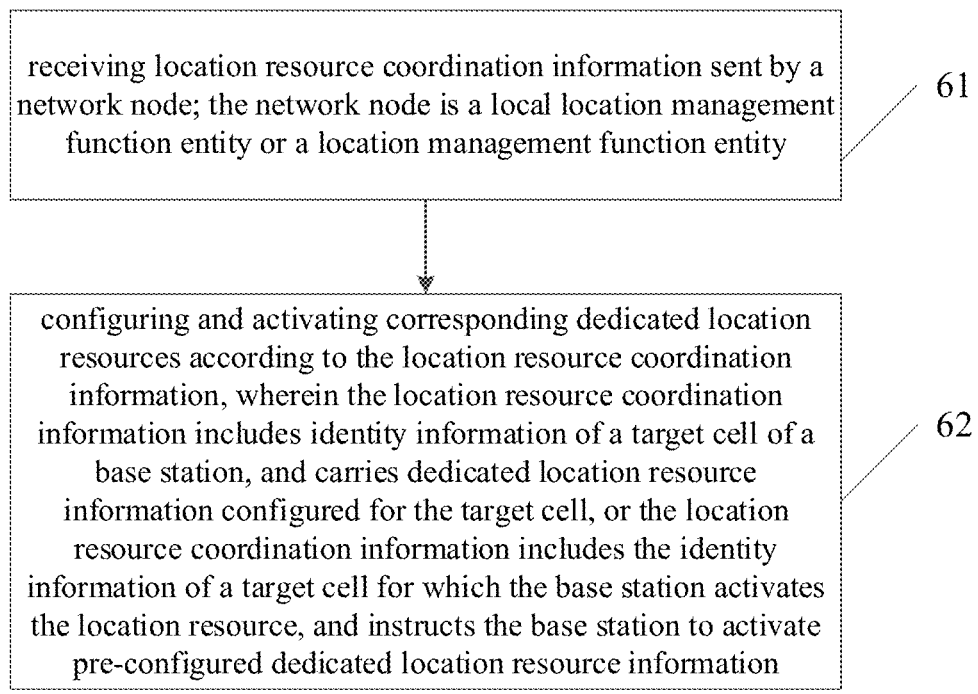
FIG. 6 is yet another flow schematic diagram of the location resource coordinating method in an embodiment of the present disclosure.

The embodiment of the present disclosure also provides a location resource coordinating method, which is applied to a base station, as shown in FIG. 6, including the following steps.

Step 61: receiving location resource coordination information sent by a network node; the network node is a local location management function entity or a location management function entity;

Step 62: configuring and activating corresponding dedicated location resources according to the location resource coordination information.

Wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

The location resource coordinating method provided by the embodiment of the present disclosure includes: receiving location resource coordination information sent by a network node; the network node is a local location management function entity or a location management function entity; configuring and activating corresponding dedicated location resources according to the location resource coordination information; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information also includes effective time information thereof; the configuring and activating the corresponding location dedicated resource according to the location resource coordination information includes: configuring corresponding dedicated location resource according to the location resource coordination information and activating the corresponding dedicated location resources at a corresponding time point.

Specifically, the effective time information is indicated in the form of a system frame number SFN.

Furthermore, after configuring and activating corresponding dedicated location resources according to the location resource coordinating information, the location resource coordinating method further includes: feeding back a first configuration success response message to the network node; wherein the first configuration success response message is a message that the configuration is successful for all or part of the target points.

Wherein if the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the receiving the location resource coordination information sent by the network node includes: receiving the location resource coordination information that is sent by the network node in the form of an LPPa data packet, transferred through an access and mobility management function entity AMF, and sent through an N2 interface.

The embodiment of the present disclosure further provides that, after receiving the location resource coordination information sent by the network node, the location resource coordinating method further includes: receiving location resource update information sent by the network node; and configuring and activating a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information also includes effective time information thereof; the configuring and activating a corresponding update process according to the location resource update information includes: configuring a corresponding update process according to the location resource update information and activating the corresponding update process at a corresponding time point.

Specifically, the effective time information is indicated in the form of a system frame number SFN.

Furthermore, after receiving the location resource update information sent by the network node, the location resource coordinating method further includes: feeding back a second configuration success response message to the network node; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the receiving location resource update information sent by the network node includes: receiving the location resource update information that is sent by the network node in the form of LPPa data packet, transferred through the access and mobility management function entity AMF, and sent by the N2 interface.

The embodiment of the present disclosure further provides that, after receiving the location resource coordination information sent by the network node, the location resource coordinating method further includes: receiving location resource release information sent by the network node; and releasing corresponding dedicated location resource information according to the location resource release information; feeding back a resource release success message to the network node; wherein the location resource release information includes the identity information of the target cell for which the base station releases the location resource; the resource release success message is a message that the resource is successfully released for all or part of the target points.

The receiving the location resource release information sent by the network node includes: receiving the location resource release information that is sent by the network node in the form of an LPPa data packet, transferred through an access and mobility management function entity AMF, and sent through an N2 interface.

The embodiment of the present disclosure further provides that, after receiving the location resource coordination information sent by the network node, the location resource coordinating method further includes: based on radio resource management RRM requirements, when there is a need to change the location resource of a target point, sending location resource coordination information to a network node; receiving a coordination success response message fed back by the network node; wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Specifically, the sending location resource coordination information to the network node includes: sending the location resource coordination information to the network node in the form of an LPPa data packet through the access and mobility management function entity AMF.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The following further describes the location resource coordinating method provided in the embodiments of the present disclosure in combination with the network node, the UE, and the base station.

In response to the above technical problem, the embodiments of the present disclosure provide a location resource coordinating method to provide a more efficient management mechanism for UE location services under the 5G location network architecture so as to ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

When the solution provided by the embodiments of the present disclosure is specifically implemented, the local location management function entity (Local LMF) can be located in the access network, for example, co-sited with a 5G base station (gNB), where the local location management function, or related location management function entity (LMF) under the 5G network architecture at least includes the following sub-functions-dynamic coordination of location resources.

When the Local LMF (or LMF) needs to perform location measurement for the serving UE, it may need to coordinate location resources with a neighboring or related base station, for example, send location resource coordination information to a target base station, and the message carries dedicated positioning reference symbol PRS information (such as bandwidth, or PRS index, etc.) configured for the target cell (optionally, it may also include the target Transmission Point TP, a target beam, etc.), or instruct to activate the pre-configured dedicated positioning PRS.

Conversely, when the location measurement is completed, the Local LMF (or LMF) will notify the neighboring or related base station to deactivate the related location resource, for example, send location resource coordination information to the target base station, and the message carries the cell information for which the location signal needs to be deactivated, does not exclude specifying specific resources (such as bandwidth, or PRS index, etc.), or deactivates the pre-configured dedicated positioning PRS.

The solution provided by the embodiment of the present disclosure may also include the update, release, renegotiation of downlink location resource, and the update of LPP dynamic resources, which are not limited herein.

Specifically, the solution provided by the embodiment of the present disclosure may specifically include the following processes.

Process 1: Process 1 for Configuring Downlink Location Resources

Step 1: when the Local LMF (or LMF) needs to perform location measurement for the serving UE, it will need to coordinate location resources with a neighboring base station, for example, send location resource coordination information to the target base station (the target base station can be Local LMF or a base station pre-configured by LMF, or a base station adjacent to the Local LMF or LMF selected by other ways). The coordination information will include the target cell of the target base station, and optionally, include the target TP, or target beam, and dedicated location resource information to be configured. Further, these dedicated location resources include, but are not limited to, the bandwidth of a positioning reference symbol PRS, PRS index (corresponding to the corresponding resource block), CP length (cyclic prefix), and a quantity of consecutive downlink (DL) subframes, a quantity of used ports, etc., optionally, it can include the effective time information of the dedicated location resource (indicated in the form of System Frame Number SFN), etc.

Step 2: after receiving this information, the target base station immediately starts to configure and activate the corresponding dedicated location resources; optionally, the corresponding dedicated location resource is activated at a time point specified in the message.

Step 3: subsequently, the target base station will feed back a configuration success response message to the LLMF (or LMF), and optionally, the target base station is allowed to respond with a message that a part of the target points are successfully configured.

Step 4: when the Local LMF (or LMF) completes the minimum configuration set of required location resources, the corresponding downlink location measurement process will be triggered.

When the LMF of the core network configures downlink location resources, the configuration message of downlink location resources can be transferred in the form of an LPPa (LTE positioning protocol A) data packets through the AMF and transmitted to the target base station using the N2 interface.

Process 2: Process 2 for Configuring Downlink Location Resources

Step 1: when the Local LMF (or LMF) needs to perform location measurement for the serving UE, it will need to coordinate location resources with neighboring base stations, for example, send location resource coordination information to the target base station (the target base station can be Local LMF or a base station pre-configured by LMF, or a base station adjacent to the Local LMF or LMF selected by other ways). The coordination information will include the target cell of the target base station for which location resources are to be activated. Optionally, it may also include the target TP or target beam. The specific dedicated location resource information has been pre-configured to the target base station (for example, through Operation Management and maintenance OAM etc.). Optionally, it may include effective time information (indicated in the form of SFN) of the dedicated location resource, etc.

Step 2: after receiving the information, the target base station immediately starts to configure and activate the corresponding dedicated location resources; optionally, the corresponding dedicated location resources are activated at the time point specified in the message.

Step 3: subsequently, the target base station will feed back a configuration success response message to the LLMF (or LMF), the message will carry corresponding dedicated location resource information, for example, including but not limited to the bandwidth of a positioning reference symbol PRS, PRS index (corresponding to the corresponding resource block), CP length (cyclic prefix), and a quantity of consecutive downlink (DL) subframes, a quantity of used ports, etc. Optionally, the target base station is allowed to respond a message that a part of target points are successfully configured.

Step 4: when the Local LMF (or LMF) completes the minimum configuration set of required location resources, the corresponding downlink location measurement process will be triggered.

When the LMF of the core network configures downlink location resources, the configuration message of downlink location resources can be transferred in the form of an LPPa (LTE positioning protocol A) data packets through the AMF and transmitted to the target base station using the N2 interface.

Process 3: Process 1 for Updating Downlink Location Resources

Step 1: when the Local LMF (or LMF) needs to update the location measurement resource or measurement signal source for the serving UE, it will need to coordinate the location resource again with the neighboring base station, for example, location resource update information is sent to the target base station (the target base station may be a base station pre-configured by Local LMF or LMF, or a base station adjacent to the Local LMF or LMF selected by other ways). The update information will include the target cell newly added by the target base station, and optionally, include the target TP, or target beam, and the dedicated location resource information to be configured. Further, these dedicated location resources include, but are not limited to, the bandwidth of a positioning reference symbol PRS, PRS index (corresponding to the corresponding resource block), CP length (cyclic prefix), and a quantity of consecutive downlink (DL) subframes, a quantity of used ports, etc., optionally, it can include the effective time information of the dedicated location resource (indicated in the form of System Frame Number SFN), etc.

In addition, optionally, the update information may include a target cell for which the target base station needs to release location resources, and optionally, may also include a target TP or a target beam.

Optionally, the update information may include the target cell for which the target base station needs to change the location resource. Optionally, it may also include the target TP, or target beam, and the dedicated location resource information that needs to be updated. Further, these dedicated location resources include, but are not limited to, the bandwidth of a positioning reference symbol PRS, PRS index (corresponding to the corresponding resource block), CP length (cyclic prefix), and a quantity of consecutive downlink (DL) subframes, a quantity of used ports, etc., optionally, it can include the effective time information of the dedicated location resource (indicated in the form of System Frame Number SFN), etc.

Step 2: after receiving this information, the target base station immediately starts configuration and activate the corresponding update process; optionally, starts to update the corresponding dedicated location resources at the time point specified in the message.

Step 3: subsequently, the target base station will feed back a configuration success response message to the LLMF (or LMF), and optionally, the target base station is allowed to respond with a message that a part of the target points are successfully configured.

Step 4: when the Local LMF (or LMF) completes the minimum configuration set of required location resources, the corresponding downlink location measurement process will be triggered.

When the LMF of the core network updates downlink location resources, the update message can be transferred in the form of an LPPa (LTE positioning protocol A) data packets through the AMF and transmitted to the target base station using the N2 interface.

Process 4: Process 2 for Updating Downlink Location Resources

Step 1: when the Local LMF (or LMF) needs to update the location measurement resource or measurement signal source for the serving UE, it will need to coordinate the location resource again with the neighboring base station, for example, location resource update information is sent to the target base station (the target base station may be a base station pre-configured by Local LMF or LMF, or a base station adjacent to the Local LMF or LMF selected by other ways). The update information will include the new target cell for which the target base station wants to activate location resources. Optionally, it may also include the target TP or target beam, and the specific dedicated location resource information has been pre-configured to the target base station (for example, through OAM, etc.). Optionally, the effective time information (indicated in the form of SFN) of the new dedicated location resource may be included.

In addition, optionally, the update information may include the target cell for which the target base station needs to release location resources, optionally, the target TP, or the target beam.

Optionally, the update information may include the target cell for which the target base station wants to change the location resources, and optionally, include the target TP, or target beam, and the specific dedicated location resource information has been pre-configured for the target base station (for example, through OAM, etc.). Optionally, the effective time information (indicated in the form of SFN) of the new dedicated location resource may be included.

Step 2: after receiving this information, the target base station immediately starts configuration and activate the corresponding update process; optionally, starts to update the corresponding dedicated location resources at the time point specified in the message;

Step 3: subsequently, the target base station will feed back a configuration success response message to the LLMF (or LMF), the message will carry the newly activated dedicated location resource information, for example, including but not limited to the bandwidth of a positioning reference symbol PRS, PRS index (corresponding to the corresponding resource block), CP length (cyclic prefix), and a quantity of consecutive downlink (DL) subframes, a quantity of used ports, etc. Optionally, the target base station is allowed to respond a message that a part of target points are successfully configured.

Step 4: when the Local LMF (or LMF) completes the minimum configuration set of required location resources, the corresponding downlink location measurement process will be triggered.

When the LMF of the core network updates the downlink location resource, the update message can be can be transferred in the form of an LPPa data packet through the AMF and transmitted to the target base station using the N2 interface.

Process 5: Process for Releasing Downlink Location Resources

Step 1: when Local LMF (or LMF) needs to release location measurement resources or measurement signal sources, it will need to exchange information with neighboring base stations, for example, send location resource release information to the target base station (the target base station can be Local LMF or a base station pre-configured by the LMF, or a base station adjacent to the Local LMF or LMF selected by other ways). The release information will include the target cell for which the target base station intends to release the location resources, and optionally, it may also include the target TP or the target beam.

Step 2: after receiving this information, the target base station immediately starts to release the corresponding dedicated location resources.

Step 3: subsequently, the target base station will feed back a resource release success response message to the LLMF (or LMF). Optionally, the target base station is allowed to respond with information that a part of target points have successfully released resources.

When the LMF of the core network releases downlink location resources, the release message can be in the form of an LPPa data packet, transferred through AMF, and transmitted to the target base station using the N2 interface.

Process 6 (Executed after any of the Processes 1 to 4): Process for Renegotiating Downlink Location Resources Step 1: when a neighboring base station configured with location resources (it can be a base station adjacent to Local LMF or LMF) needs to change the location resource of the target point based on radio resource management (RRM) requirements, it needs to coordinate location resources with LLMF (or LMF). For example, location resource coordination information is sent to LLMF (or LMF). The coordination information will include the target cell for which the neighboring base station wants to update the location resources, and optionally, includes the target TP, or target beam, and recommended dedicated location resource information. Further, these dedicated location resources include, but are not limited to, the bandwidth of PRS, PRS index (corresponding to the corresponding resource block), CP length, a quantity of consecutive DL subframes, a quantity of used ports, and so on.

In addition, optionally, the coordination information further includes the target cell for which the target base station needs to release location resources, and optionally, includes the target TP or target beam.

Step 2: after receiving this information, the LLMF (or LMF) will feed back the coordination success response message based on the positioning requirements, and optionally, the LLMF (or LMF) is allowed to reject the location resource update information of a part of target points.

Step 3: after the base station that initiated the resource renegotiation receives the response message, it will start the corresponding update process for the successfully responded target point; optionally, for the rejected target point, the corresponding location resource will be released.

When the neighboring base station intends to negotiate downlink location resources with the LMF of the core network, the coordination information can be transmitted to the LMF entity of the core network in the form of an LPPa data packet through AMF.

Process 7: Process for Updating LPP (LPP is a Peer Layers Location Protocol Between the UE and a Positioning Server) Dynamic Resources Step 1: when LLMF (or LMF) decides to change (update) the location resources of a reference cell or a neighboring cell, including but not limited to the bandwidth of PRS, PRS index (corresponding to the corresponding resource block), CP Length, a quantity of consecutive DL subframes, a quantity of used ports, etc.; a corresponding LPP message (such as Observed Time Difference of Arrival OTDOA auxiliary information) is formed, the message carries updated location resource configuration information, and/or deleted location resource configuration information.

Step 2: LLMF (or LMF) sends the corresponding LPP message to a UE which has positioning requirements through the air interface.

Step 3: upon receiving the LPP message, the UE store the latest location configuration information for the updated location resource configuration information; for the deleted location resource configuration information, the corresponding location configuration information will be removed to avoid the UE from measuring error location signals.

That is, when the location resource changes, the Local LMF (or LMF) is allowed to transmit the change information to the UE through the LPP protocol. The information at least includes updated location resource configuration information and/or deleted location resource configuration information.

It can be seen from the above that the present disclosure provides a location resource coordinating method (a dynamic coordinating method of location resources) to ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

The embodiment of the present disclosure also provides a network node, which is a local location management function entity or a location management function entity; includes a memory, a processor, a transceiver, and a computer program stored in the memory and executed by the processor. When the processor executes the program, the following steps are implemented: sending location resource coordination information to a base station before performing location measurement for a serving UE.

The location resource coordination information includes identity information of a target cell of the base station, and carries dedicated location resource information configured for the target cell, or the location resource coordination information includes the identity information of a target cell for which the base station activates the location resource, and instructs the base station to activate pre-configured dedicated location resource information.

The base station is a base station related to the serving UE.

The network node provided by the embodiment of the present disclosure sends location resource coordination information to the base station before performing location measurement for the serving UE; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information; the base station is a base station related to the service UE. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

Figure 7:
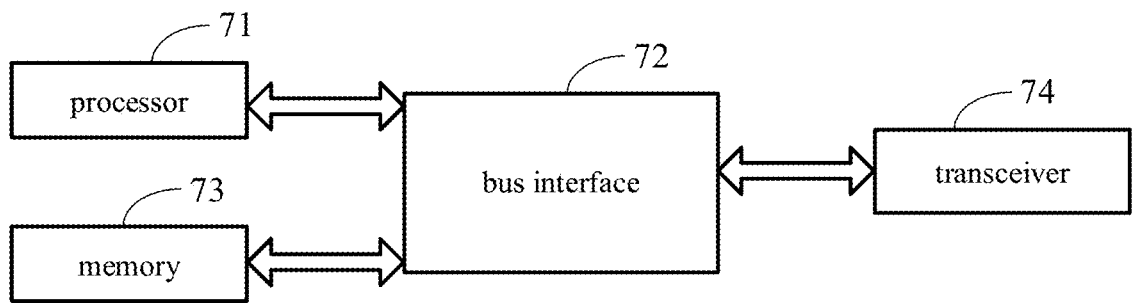
FIG. 7 is a schematic structure diagram of a network node in an embodiment of the present disclosure.

Specifically, as shown in FIG. 7, the network node of the embodiment of the present disclosure includes: a processor 71; and a memory 73 connected to the processor 71 through a bus interface 72, the memory 73 is used to store programs and data used by the processor 71 when performing operations, when the processor 71 calls and executes the programs and data stored in the memory 73, the following process is executed: sending location resource coordination information to a base station by the transceiver 74 before performing location measurement for a serving UE.

The location resource coordination information includes identity information of a target cell of the base station, and carries dedicated location resource information configured for the target cell, or the location resource coordination information includes the identity information of a target cell for which the base station activates the location resource, and instructs the base station to activate pre-configured dedicated location resource information. The base station is a base station related to the serving UE.

The transceiver 74 is connected to the bus interface 72 for receiving and sending data under the control of the processor 71.

It should be noted that in FIG. 7, the bus architecture may include any number of interconnected buses and bridges. Specifically, various circuits of one or more processors represented by the processor 71 and the memory represented by the memory 73 are linked together. The bus architecture can also link various other circuits such as peripherals, voltage regulators, power management circuits, etc., which are all known in the art, and therefore, no further descriptions are provided herein. The bus interface provides the interface. The transceiver 74 may be a plurality of components, that is, include a transmitter and a receiver, and provide a unit for communicating with various other devices on the transmission medium. The processor 71 is responsible for managing the bus architecture and general processing, and the memory 73 can store data used by the processor 71 when performing operations.

Those skilled in the art can understand that all or part of the steps in the above-mentioned embodiments can be implemented by hardware, or by a computer program to instruct relevant hardware. The computer program includes instructions for executing part or all of the steps of the above-mentioned method. The computer program can be stored in a readable storage medium, which can be any form of storage medium.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information also includes effective time information thereof.

Specifically, the effective time information is indicated in the form of a system frame number SFN.

Furthermore, the processor is further configured to: receive a first configuration success response message fed back by the base station through the transceiver after sending the location resource coordination information to the base station; and trigger a corresponding downlink location measurement process after completing a minimum configuration set of required location resources; wherein the first configuration success response message is a message that the configuration is successful for all or part of the target points.

If the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the processor is specifically configured to: transfer the location resource coordination information in the form of an LPPa data packet through an access and mobility management function entity AMF, and then transmit the same to the base station through an N2 interface.

The processor is further configured to: after sending location resource coordination information to the base station, before updating the location measurement resource or measurement signal source for the service UE, send a location resource update information to the base station through the transceiver; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information; or the base station is a base station related to the service UE.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information also includes effective time information thereof.

Specifically, the effective time information is indicated in the form of a system frame number SFN.

Furthermore, the processor is further configured to: after sending location resource update information to the base station, receive a second configuration success response message fed back by the base station through the transceiver; and trigger a corresponding downlink location measurement process after completing a minimum configuration set of required location resources; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the processor is specifically configured to: transfer the location resource update information in the form of LPPa data packet through an access and mobility management function entity AMF, and then transmit the same to the base station through an N2 interface through the transceiver.

The embodiment of the present disclosure further provides that the processor is further configured to: after sending location resource coordination information to the base station, send location resource release information to the base station and receive a resource release success message fed back by the base station through the transceiver; wherein the location resource release information includes the identity information of a target cell for which the base station releases the location resource; the resource release success message is a message that the resource is successfully released for all or part of the target points.

Wherein, the processor is specifically configured to use the transceiver to transfer the location resource release information in the form of an LPPa data packet through the access and mobility management function entity AMF, and transmit the same to the base station through the N2 interface.

The processor is further configured to: after sending location resource coordination information to the base station, use the transceiver to receive the location resource coordination information sent by the base station; and use the transceiver to feed back a coordination success response message to the base station according to the location requirements, wherein the location resource coordination information includes the identity information of the target cell for which the base station updates the location resource and corresponding recommended dedicated location resource information; or the location resource coordination information includes the identity information of the target cell for which the base station releases the location resource; the coordination success response message is a message that the coordination is successful for all or part of the target points.

Specifically, the processor is specifically configured to use the transceiver to receive the location resource coordination information transferred by the access and mobility management function entity AMF in the form of LPPa data packet sent by the base station.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The processor is further configured to: after sending location resource coordination information to the base station, use the changed location resource information to form a corresponding peer layers positioning protocol LPP message, the LPP message carries updated location resource configuration information, and/or deleted location resource configuration information; and sending the LPP message to a UE that has a positioning requirement.

The embodiments of the location resource coordinating method on the network node side are all applicable to the embodiments of the network node, and the same technical effect can also be achieved.

The embodiments of the present disclosure also provide a UE, including a memory, a processor, a transceiver, and a computer program stored in the memory and executed by the processor; when the processor executes the program, the following steps are achieved: receiving a peer layers positioning protocol LPP message sent by a network node through the transceiver; and changing location configuration information according to the LPP message.

Wherein the LPP message carries updated location resource configuration information, and/or deleted location resource configuration information.

The network node is a local location management function entity or a location management function entity.

The UE provided by the embodiment of the present disclosure receives a peer layers positioning protocol LPP message sent by a network node through the transceiver; changes location configuration information according to the LPP message; wherein the LPP message carries updated location resource configuration information and/or, deleted location resource configuration information; the network node is a local location management function entity or a location management function entity. It may be avoided that the UE measures an error location signal, and can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

Figure 8:
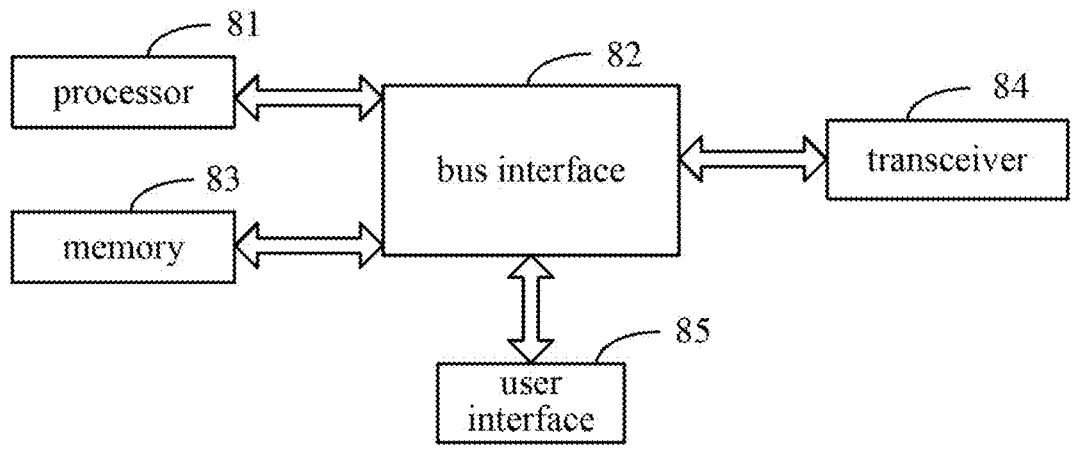
FIG. 8 is a schematic structure diagram of a user equipment in an embodiment of the present disclosure.

Specifically, as shown in FIG. 8, the UE provided by the embodiment of the present disclosure includes: a processor 81; and a memory 83 connected to the processor 81 through a bus interface 82, the memory 83 is used to store programs and data used by the processor 81 when performing operations, when the processor 81 calls and executes the programs and data stored in the memory 83, the following process is executed: receiving a peer layers positioning protocol LPP message sent by a network node through the transceiver 84; changing location configuration information according to the LPP message.

Wherein the LPP message carries updated location resource configuration information, and/or deleted location resource configuration information.

The network node is a local location management function entity or a location management function entity.

The transceiver 84 is connected to the bus interface 82 for receiving and sending data under the control of the processor 81.

It should be noted that in FIG. 8, the bus architecture may include any number of interconnected buses and bridges. Specifically, various circuits of one or more processors represented by the processor 81 and the memory represented by the memory 83 are linked together. The bus architecture can also link various other circuits such as peripherals, voltage regulators, power management circuits, etc., which are all known in the art, and therefore, no further descriptions are provided herein. The bus interface provides the interface. The transceiver 84 may be a plurality of components, that is, including a transmitter and a receiver, and provide a unit for communicating with various other devices on the transmission medium. For different UEs, the user interface 85 may also be an interface capable of connecting externally and internally with required equipment. The connected equipment includes but not limited to a keypad, a display, a speaker, a microphone, a joystick, and the like. The processor 81 is responsible for managing the bus architecture and general processing, and the memory 83 can store data used by the processor 81 when performing operations.

Those skilled in the art can understand that all or part of the steps in the above-mentioned embodiments can be implemented by hardware, or by a computer program to instruct relevant hardware. The computer program includes instructions for executing part or all of the steps of the above-mentioned method; and the computer program can be stored in a readable storage medium, which can be any form of storage medium.

Specifically, the processor is specifically configured to: store the latest location configuration information according to the location resource configuration information updated in the LPP message; and/or remove the corresponding location configuration information according to the location resource configuration information deleted in the LPP message.

The foregoing embodiments of the location resource coordinating method on the UE side are all applicable to the embodiments of the UE, and the same technical effect can also be achieved.

The embodiment of the present disclosure also provides a base station, including a memory, a processor, a transceiver, and a computer program stored on the memory and executed by the processor; when the processor executes the program, the following steps are achieved: receiving location resource coordination information sent by a network node through the transceiver; the network node is a local location management function entity or a location management function entity; configuring and activating corresponding dedicated location resources according to the location resource coordination information.

Wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

The base station provided by the embodiment of the present disclosure receives location resource coordination information sent by a network node through the transceiver; the network node is a local location management function entity or a location management function entity; the network node is a local location management function entity or a location management function entity; configures and activates corresponding dedicated location resources according to the location resource coordination information; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

Figure 9:
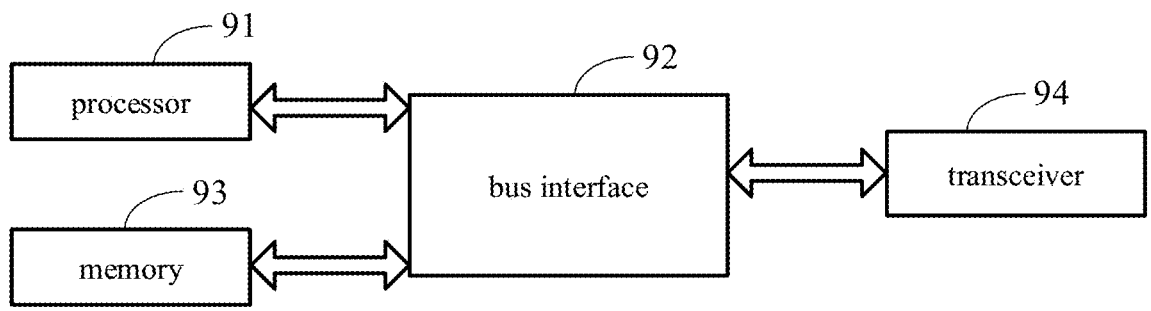
FIG. 9 is a schematic structure diagram of a base station in an embodiment of the present disclosure.

Specifically, as shown in FIG. 9, the base station in the embodiment of the present disclosure includes: a processor 91; and a memory 93 connected to the processor 91 through a bus interface 92, the memory 93 is used to store programs and data used by the processor 91 when performing operations, when the processor 91 calls and executes the programs and data stored in the memory 93, the following process is executed: receiving location resource coordination information sent by a network node through the transceiver 94; the network node is a local location management function entity or a location management function entity; configuring and activating corresponding dedicated location resources according to the location resource coordination information.

Wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

The transceiver 94 is connected to the bus interface 92 for receiving and sending data under the control of the processor 91.

It should be noted that in FIG. 9, the bus architecture may include any number of interconnected buses and bridges, and specifically various circuits of one or more processors represented by the processor 91 and the memory represented by the memory 93 are linked together. The bus architecture can also link various other circuits such as peripherals, voltage regulators, power management circuits, etc., which are all known in the art, and therefore, no further descriptions are provided herein. The bus interface provides the interface. The transceiver 94 may be a plurality of components, that is, including a transmitter and a receiver, and provide a unit for communicating with various other devices on the transmission medium. The processor 91 is responsible for managing the bus architecture and general processing, and the memory 93 can store data used by the processor 91 when performing operations.

Those skilled in the art can understand that all or part of the steps in the above-mentioned embodiments can be implemented by hardware, or by a computer program to instruct relevant hardware. The computer program includes instructions for executing part or all of the steps of the above-mentioned method; and the computer program can be stored in a readable storage medium, which can be any form of storage medium.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information further includes its own effective time information; the processor is specifically configured to configure corresponding dedicated location resource according to the location resource coordination information and activate the corresponding dedicated location resources at a corresponding time point.

Specifically, the effective time information is indicated in the form of a system frame number SFN.

Furthermore, the processor is further configured to: after configuring and activating corresponding dedicated location resources according to the location resource coordination information, feed back a first configuration success response message to the network node; wherein the first configuration success response message is a message that the configuration is successful for all or part of the target points.

Wherein if the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the processor is specifically configured to: use the transceiver to receive the location resource coordination information that is sent by the network node in the form of an LPPa data packet, transferred through an access and mobility management function entity AMF, and sent through an N2 interface.

The processor is further configured to: after receiving the location resource coordination information sent by the network node, receive location resource update information sent by the network node through the transceiver; and configure and activate a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information further includes its own effective time information; the processor is specifically configured to configure a corresponding update process according to the location resource update information and activate the corresponding update process at a corresponding time point.

Specifically, the effective time information is indicated in the form of a system frame number SFN.

Furthermore, the processor is further configured to: after receiving the location resource update information sent by the network node, feed back a second configuration success response message to the network node; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the processor is specifically configured to: use the transceiver to receive the location resource update information that is sent by the network node in the form of LPPa data packet, transferred through the access and mobility management function entity AMF, and sent by the N2 interface.

The processor is further configured to: after receiving the location resource coordination information sent by the network node, receive location resource release information sent by the network node; and release corresponding dedicated location resource information according to the location resource release information; feed back a resource release success message to the network node; wherein the location resource release information includes the identity information of the target cell for which the base station releases the location resource; the resource release success message is a message that the resource is successfully released for all or part of the target points.

Wherein, the processor is specifically configured to: use the transceiver to receive the location resource release information that is sent by the network node in the form of an LPPa data packet, transferred through an access and mobility management function entity AMF, and sent through an N2 interface.

The processor is further configured to: after receiving the location resource coordination information sent by the network node, based on radio resource management RRM requirements, when there is a need to change the location resource of a target point, send location resource coordination information to a network node; receive a coordination success response message fed back by the network node;

wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Specifically, the processor is specifically configured to: use the transceiver to send the location resource coordination information to the network node in the form of an LPPa data packet through the access and mobility management function entity AMF.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The embodiments of the location resource coordinating method on the base station side are all applicable to the embodiments of the base station, and the same technical effect can also be achieved.

The embodiment of the present disclosure also provides a computer-readable storage medium on which a computer program is stored, and when the program is executed by a processor, the steps of the location resource coordinating method on the network node side are realized.

When the program is executed by the processor, the steps of the location resource coordinating method on the UE side are realized.

When the program is executed by the processor, the steps of the location resource coordinating method on the base station side are realized.

The embodiments of the location resource coordinating method on the network node side, the UE side, and the base station side are all applicable to the embodiment of the computer-readable storage medium, and the same technical effect can be achieved.

Figure 10:
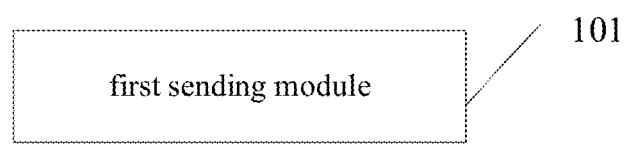
FIG. 10 is a schematic structure diagram of a location resource coordinating device in an embodiment of the present disclosure.

The embodiment of the present disclosure also provides a location resource coordination device, which is applied to a network node, and the network node is a local location management function entity or a location management function entity; as shown in FIG. 10, the location resource coordination device includes: a first sending module 101, configured to send location resource coordination information to a base station before performing location measurement for a serving UE.

The location resource coordination information includes identity information of a target cell of the base station, and carries dedicated location resource information configured for the target cell, or the location resource coordination information includes the identity information of a target cell for which the base station activates the location resource, and instructs the base station to activate pre-configured dedicated location resource information.

The base station is a base station related to the serving UE.

The location resource coordination device provided in the embodiment of the present disclosure sends location resource coordination information to the base station before performing location measurement for the serving UE; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information; the base station is a base station related to the service UE. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information also includes effective time information thereof.

Specifically, the effective time information is indicated in the form of a system frame number SFN.

Furthermore, the location resource coordination device further includes: a first receiving module, configured to receive a first configuration success response message fed back by the base station; and a first trigger module, configured to trigger a corresponding downlink location measurement process after completing a minimum configuration set of required location resources; wherein the first configuration success response message is a message that the configuration is successful for all or part of the target points.

If the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the first sending module includes: a first sending sub-module, configured to transfer the location resource coordination information in the form of an LPPa data packet through an access and mobility management function entity AMF, and then transmit the same to the base station through an N2 interface.

The embodiment of the present disclosure further provides that the location resource coordination device further includes: a second sending module, configured to, after the location resource coordination information is sent to the base station, send location resource update information to the base station before updating a location measurement resource or a measurement signal source for the serving UE; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information; or the base station is a base station related to the service UE.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information also includes effective time information thereof.

Specifically, the effective time information is indicated in the form of a system frame number SFN.

Furthermore, the location resource coordination device further includes: a second receiving module, configured to receive a second configuration success response message fed back by the base station after sending location resource update information to the base station; and a second trigger module, configured to trigger a corresponding downlink location measurement process after completing a minimum configuration set of required location resources; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the second sending module includes: a second sending sub-module, configured to transfer the location resource update information in the form of LPPa data packet through an access and mobility management function entity AMF, and then transmitting the same to the base station through an N2 interface.

The embodiment of the present disclosure further provides that the location resource coordination device further includes: a third sending module, configured to send location resource release information to the base station after sending location resource coordination information to the base station; and a third receiving module, configured to receive a resource release success message fed back by the base station; wherein the location resource release information includes the identity information of a target cell for which the base station releases the location resource; the resource release success message is a message that the resource is successfully released for all or part of the target points.

Wherein, the third sending module includes: a third sending sub-module, which is used to transfer the location resource release information in the form of an LPPa data packet through an access and mobility management function entity AMF, and transmit the same to the base station through an N2 interface.

The embodiment of the present disclosure further provides that the location resource coordination device further includes: a fourth receiving module, configured to receive the location resource coordination information sent by the base station after sending the location resource coordination information to the base station; and the first feedback module, configured to feed back a coordination success response message to the base station according to the location requirements, wherein the location resource coordination information includes the identity information of the target cell for which the base station updates the location resource and corresponding recommended dedicated location resource information; or the location resource coordination information includes the identity information of the target cell for which the base station releases the location resource; the coordination success response message is a message that the coordination is successful for all or part of the target points.

Specifically, the fourth receiving module includes: a first receiving sub-module, configured to receive the location resource coordination information transferred by the access and mobility management function entity AMF in the form of LPPa data packets sent by the base station.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The embodiment of the present disclosure further provides that the location resource coordination device further includes: a first processing module, configured to use the changed location resource information to form a corresponding peer layers positioning protocol LPP message, the LPP message carries updated location resource configuration information, and/or deleted location resource configuration information; and send the LPP message to a UE that has a positioning requirement.

The embodiments of the location resource coordinating method on the network node side are all applicable to the embodiments of the location resource coordination device, and the same technical effect can also be achieved.

Figure 11:
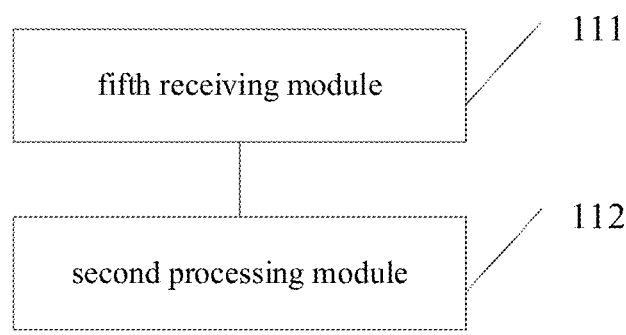
FIG. 11 is another schematic structure diagram of the location resource coordinating device in the embodiment of the present disclosure.

The embodiment of the present disclosure also provides a location resource coordinating device, which is applied to a UE, as shown in FIG. 11, including: a fifth receiving module 111, configured to receive a peer layers positioning protocol LPP message sent by a network node; and a second processing module 112, configured to change location configuration information according to the LPP message.

Wherein the LPP message carries updated location resource configuration information, and/or deleted location resource configuration information.

The network node is a local location management function entity or a location management function entity.

The location resource coordination device provided by the embodiment of the present disclosure receives a peer layers positioning protocol LPP message sent by a network node; changes location configuration information according to the LPP message; wherein the LPP message carries updated location resource configuration information and/or, deleted location resource configuration information; the network node is a local location management function entity or a location management function entity. It may be avoided that the UE measures an error location signal, and can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

Specifically, the second processing module includes: a first processing sub-module, configured to store the latest location configuration information according to the location resource configuration information updated in the LPP message; and/or removing the corresponding location configuration information according to the location resource configuration information deleted in the LPP message.

Wherein, the embodiments of the location resource coordinating method on the UE side are all applicable to the embodiments of the location resource coordination device, and the same technical effect can also be achieved.

Figure 12:
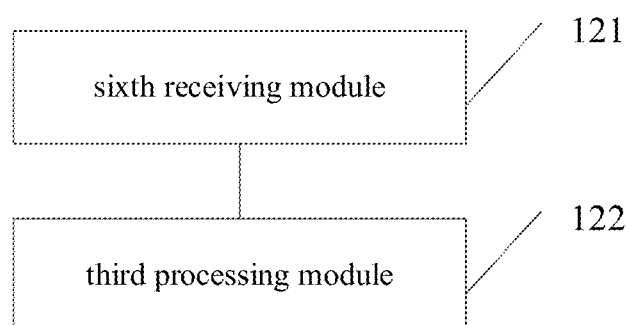
FIG. 12 is yet another schematic structure diagram of the location resource coordinating device in the embodiment of the present disclosure.

The embodiment of the present disclosure also provides a location resource coordinating device, which is applied to a base station, as shown in FIG. 12, including: a sixth receiving module 121, configured to receive location resource coordination information sent by a network node; the network node is a local location management function entity or a location management function entity; a third processing module 122, configured to configure and activate corresponding dedicated location resources according to the location resource coordination information.

Wherein the location resource coordination information includes identity information of a target cell of a base station, and carries dedicated location resource information configured for the target cell, or the location resource coordination information includes the identity information of a target cell for which the base station activates the location resource, and instructs the base station to activate pre-configured dedicated location resource information.

The location resource coordination device provided by the embodiment of the present disclosure receives location resource coordination information sent by a network node; the network node is a local location management function entity or a location management function entity; configures and activates corresponding dedicated location resources according to the location resource coordination information; wherein the location resource coordination information includes the identity information of the target cell of the base station, and carries the dedicated location resource information configured for the target cell, or the location resource coordination information includes the identity information of the target cell for which the base station activates the location resource, and instructs the base station to activate the pre-configured dedicated location resource information. It can ensure that on the basis of the sinking of the relevant 5G location network or location management function, the network resources of a plurality of nodes may be coordinated in a better way and additional signal interference caused by redundant location resource to other network units is reduced, more efficient and flexible services for UE location service are provided.

The dedicated location resource information configured for the target cell includes at least one of the following information: bandwidth information of a positioning reference symbol PRS; PRS index information; cyclic prefix CP length information; a quantity of continuous downlink DL subframes; a quantity of ports.

Further, the dedicated location resource information also includes its own effective time information; the third processing module includes: a second processing sub-module, configured to configure corresponding dedicated location resource according to the location resource coordination information and activate the corresponding dedicated location resources at a corresponding time point.

Specifically, the effective time information is indicated in the form of a system frame number SFN.

Furthermore, the location resource coordination device further includes: a second feedback module, configured to feed back a first configuration success response to the network node after configuring and activating corresponding dedicated location resources according to the location resource coordination information; wherein, the first configuration success response message is a message that the configuration is successful for all or part of the target points.

Wherein if the location resource coordination information instructs the base station to activate pre-configured dedicated location resource information, the first configuration success response message includes at least one of the following information: bandwidth information of a positioning reference symbol PRS; PRS index information; cyclic prefix CP length information; a quantity of consecutive downlink DL subframes; a quantity of ports.

Specifically, the sixth receiving module includes: a second receiving sub-module, configured to receive the location resource coordination information that is sent by the network node in the form of an LPPa data packet, transferred through an access and mobility management function entity AMF, and sent through an N2 interface.

The embodiment of the present disclosure further provides that the location resource coordination device further includes: a seventh receiving module, configured to receive location resource update information sent by the network node after receiving the location resource coordination information sent by the network node; a fourth processing module, configured to configure and activate a corresponding update process according to the location resource update information; wherein the location resource update information includes the identity information of the target cell newly added by the base station, and carries dedicated location resource information configured for the target cell newly added by the base station; or the location resource update information includes identity information of a target cell for which the base station releases the location resource; or the location resource update information includes identity information of a target cell for which the base station changes the location resource, and carries the dedicated location resource information updated for the target cell for which the base station changes the location resource; or the location resource update information includes the identity information of a newly added target cell for which that the base station activates the location resource, and instructs the base station to activate the corresponding pre-configured dedicated location resource information; or the location resource update information includes the identity information of the target cell for which the base station changes the location resource, and instructs the base station to activate the corresponding pre-configured dedicated location resource information.

The dedicated location resource information configured for the target cell newly added by the base station, and/or the dedicated location resource information updated for the target cell for which the base station changes the location resource, includes at least one of the following information: bandwidth information of positioning reference symbol PRS; PRS index information; cyclic prefix CP length information; a quantity of continuous downlink DL subframes; a quantity of ports.

Further, the location resource update information also includes its own effective time information; the fourth processing module includes: a third processing sub-module, configured to configure a corresponding update process according to the location resource update information and activate the corresponding update process at a corresponding time point.

Specifically, the effective time information is indicated in the form of a system frame number SFN.

Further, the location resource coordination device further includes: a third feedback module, configured to feed back a second configuration success response message to the network node; wherein the second configuration success response message is a message that the configuration is successful for all or part of the target points.

If the location resource update information instructs the base station to activate the corresponding pre-configured dedicated location resource information, the second configuration success response message includes at least one of the following information: bandwidth information of a positioning reference symbol PRS; PRS index information; cyclic prefix CP length information; a quantity of continuous downlink DL subframes; a quantity of ports.

Specifically, the seventh receiving module includes: a third receiving sub-module, configured to receive the location resource update information that is sent by the network node in the form of LPPa data packet, transferred through the access and mobility management function entity AMF, and sent by the N2 interface.

The location resource coordination device further includes: an eighth receiving module, configured to receive location resource release information sent by the network node after receiving the location resource coordination information sent by the network node; a fifth processing module, configured to release corresponding dedicated location resource information according to the location resource release information; feed back a resource release success message to the network node; wherein the location resource release information includes the identity information of the target cell for which the base station releases the location resource; the resource release success message is a message that the resource is successfully released for all or part of the target points.

Wherein, the eighth receiving module includes: a fourth receiving sub-module, configured to receive the location resource release information that is sent by the network node in the form of an LPPa data packet, transferred through an access and mobility management function entity AMF, and sent through an N2 interface.

The location resource coordination device further includes: a fifth sending module, configured to, after receiving the location resource coordination information sent by the network node, based on radio resource management RRM requirements, when there is a need to change the location resource of a target point, send location resource coordination information to a network node; receive a coordination success response message fed back by the network node; wherein the location resource coordination information includes identity information of a target cell for which the base station updates the location resource and the corresponding recommended dedicated location resource information; or the location resource coordination information includes identity information of a target cell for which the base station releases the location resource; the coordination success response message is a message that coordination is successful for all or part of the target points.

Specifically, the fifth sending module includes: a fourth sending sub-module, configured to send the location resource coordination information to the network node in the form of an LPPa data packet through the access and mobility management function entity AMF.

The recommended dedicated location resource information includes at least one of the following information: bandwidth information of a positioning reference symbol PRS; PRS index information; cyclic prefix CP length information; a quantity of consecutive downlink DL subframes; a quantity of used ports.

The embodiments of the location resource coordinating method on the base station side are all applicable to the embodiments of the location resource coordinating device, and the same technical effect can also be achieved.

It should be noted that many functional components described in this specification are referred to as modules/sub-modules, in order to emphasize the independence of their implementation modes more particularly.

In the embodiments of the present disclosure, the modules/sub-modules may be implemented by software so as to be executed by various types of processors. For example, an identified executable code module may include one or more physical or logical blocks of computer instructions, for example, it may be constructed as an object, process, or function. Nevertheless, the executable code of the identified module does not need to be physically located together, but can include different instructions stored in different bits. When these instructions are logically combined together, they constitute a module and implement the function of the module.

In fact, the executable code module may be a single instruction or many instructions, and may even be distributed on multiple different code segments, distributed in different programs, and distributed across multiple memory devices. Likewise, operating data can be identified within the module, and can be implemented in any suitable form and organized in any suitable type of data structure. The operating data may be collected as a single data set, or may be distributed in different locations (including on different storage devices), and may at least partly exist as electronic signals on the system or network.

When the module can be realized by software, considering the level of related hardware technology, the module can be realized by software. Without considering the cost, those skilled in the art can build the corresponding hardware circuit to realize the corresponding function. The hardware circuits include conventional very large-scale integrated (VLSI) circuits or gate arrays, and related semiconductors such as logic chips, transistors, or other discrete components. Modules can also be implemented with programmable hardware devices, such as field programmable gate arrays, programmable array logic, programmable logic devices, etc.

Those skilled in the art should understand that the embodiments of the present disclosure may be provided as methods, devices, or computer program products. Therefore, the embodiments of the present disclosure may adopt the form of a complete hardware embodiment, a complete software embodiment, or an embodiment combining software and hardware. Moreover, the embodiments of the present disclosure may adopt the form of a computer program product implemented on one or more computer-usable storage medium (including but not limited to disk storage, CD-ROM, optical storage, etc.) containing computer-usable program codes. The computer-usable storage medium may be volatile or nonvolatile.

The above descriptions merely describe optional implementations of the present disclosure. It is appreciated, modifications and improvements may be made by a person of ordinary skill in the art without departing from the principle of the present disclosure, and these modifications and improvements shall be deemed as falling within the scope of the present disclosure as well.

What is claimed is:

1. A location resource coordinating method, applied to a network node, the network node being a local location management function entity or a location management function entity, wherein the location resource coordinating method comprises:
   sending location resource coordination information to a base station before performing location measurement for a user equipment (UE) being served;
   wherein the location resource coordination information includes identity information of a target cell of the base station, and carries dedicated location resource information configured for the target cell, or
   the location resource coordination information includes the identity information of a target cell for which the base station activates a location resource, and instructs the base station to activate pre-configured dedicated location resource information;
   the base station is a base station related to the UE being served.

2. The location resource coordinating method according to claim 1, wherein dedicated location resource information configured for the target cell includes at least one of the following information:
   bandwidth information of a positioning reference symbol (PRS);
   PRS index information;
   cyclic prefix (CP) length information;
   a quantity of continuous downlink (DL) subframes;
   a quantity of ports.

3. The location resource coordinating method according to claim 1, wherein after sending the location resource coordination information to the base station, the location resource coordinating method further comprises:
   receiving a first configuration success response message fed back by the base station; and
   triggering a corresponding downlink location measurement process after completing a minimum configuration set of required location resources,
   wherein the first configuration success response message is a message that the configuration is successful for all or part of target points.

4. The location resource coordinating method according to claim 3, wherein if the location resource coordination information instructs the base station to activate pre-configured dedicated location resource information, the first configuration success response message comprises at least one of the following information:
   bandwidth information of a PRS;
   PRS index information;
   CP length information;
   a quantity of consecutive DL subframes;
   a quantity of ports.

5. The location resource coordinating method according to claim 1, wherein the sending the location resource coordination information to the base station comprises:
   transferring the location resource coordination information in a form of an LPPa data packet through an access and mobility management function entity (AMF), and transmitting the location resource coordination information to the base station through an N2 interface.

6. The location resource coordinating method according to claim 1, wherein after the location resource coordination information is sent to the base station, the location resource coordinating method further comprises:
   sending location resource update information to the base station before updating a location measurement resource or a measurement signal source for the UE being served;
   wherein the location resource update information includes identity information of a target cell newly added by the base station, and carries dedicated location resource information configured for the target cell newly added by the base station; or
   the location resource update information includes identity information of a target cell for which the base station releases the location resource; or
   the location resource update information includes identity information of a target cell for which the base station changes the location resource, and carries the dedicated location resource information updated for the target cell for which the base station changes the location resource; or
   the location resource update information includes identity information of a newly added target cell for which that the base station activates the location resource, and instructs the base station to activate corresponding pre-configured dedicated location resource information; or
   the location resource update information includes the identity information of the target cell for which the base station changes the location resource, and instructs the base station to activate the corresponding pre-configured dedicated location resource information;
   the base station is a base station related to the UE being served.

7. The location resource coordinating method according to claim 6, wherein the dedicated location resource information configured for the target cell newly added by the base station, and/or the dedicated location resource information updated for the target cell for which the base station changes the location resource, includes at least one of the following information:
   bandwidth information of PRS;
   PRS index information;
   CP length information;
   a quantity of continuous DL subframes;
   a quantity of ports.

8. The location resource coordinating method according to claim 6, wherein, after sending the location resource update information to the base station, the location resource coordinating method further comprises:
   receiving a second configuration success response message fed back by the base station; and
   triggering a corresponding downlink location measurement process after completing a minimum configuration set of required location resources,
   wherein the second configuration success response message is a message that the configuration is successful for all or part of target points.

9. The location resource coordinating method according to claim 8, wherein if the location resource update information instructs the base station to activate the corresponding pre-configured dedicated location resource information, the second configuration success response message includes at least one of the following information:
   bandwidth information of a PRS;
   PRS index information;
   CP length information;
   a quantity of continuous DL subframes;
   a quantity of ports.

10. The location resource coordinating method according to claim 6, wherein the sending location resource update information to the base station comprises:
transferring the location resource update information in the form of an LPPa data packet through an access and mobility management function entity (AMF), and transmitting the location resource update information to the base station through an N2 interface.

11. The location resource coordinating method according to claim 1, wherein after sending location resource coordination information to the base station, the location resource coordinating method further comprises:
sending location resource release information to the base station;
receiving a resource release success message fed back by the base station;
wherein the location resource release information includes identity information of a target cell for which the base station releases the location resource,
the resource release success message is a message that the resource is successfully released for all or part of target points.

12. The location resource coordinating method according to claim 11, wherein the sending the location resource release information to the base station comprises:
transferring the location resource release information in a form of an LPPa data packet through an access and mobility management function entity (AMF), and transmitting the location resource release information to the base station through an N2 interface.

13. The location resource coordinating method according to claim 1, wherein after sending the location resource coordination information to the base station, the location resource coordinating method further comprises:
receiving the location resource coordination information sent by the base station; and
feeding back a coordination success response message to the base station according to positioning requirements,
wherein the location resource coordination information includes identity information of a target cell for which the base station updates the location resource and corresponding recommended dedicated location resource information; or the location resource coordination information includes identity information of a target cell for which the base station releases the location resource;
the coordination success response message is a message that the coordination is successful for all or part of target points.

14. The location resource coordinating method according to claim 13, wherein the recommended dedicated location resource information comprises at least one of the following information:
bandwidth information of a PRS;
PRS index information;
CP length information;
a quantity of consecutive DL subframes;
a quantity of ports.

15. The location resource coordinating method according to claim 1, wherein after sending the location resource coordination information to the base station, the location resource coordinating method further comprises:
using the changed location resource information to form a corresponding peer layers positioning protocol (LPP) message, the LPP message carrying updated location resource configuration information, and/or deleted location resource configuration information; and
sending the LPP message to a user equipment (UE) that has a positioning requirement.

16. A location resource coordinating method, applied to a user equipment (UE), comprising:
receiving a peer layers positioning protocol (LPP) message sent by a network node;
changing location configuration information according to the LPP message;
wherein the LPP message carries updated location resource configuration information, and/or deleted location resource configuration information,
the network node is a local location management function entity or a location management function entity.

17. A location resource coordinating method, applied to a base station, comprising:
receiving location resource coordination information sent by a network node; the network node is a local location management function entity or a location management function entity;
configuring and activating corresponding dedicated location resources according to the location resource coordination information;
wherein the location resource coordination information includes identity information of a target cell of a base station, and carries dedicated location resource information configured for the target cell, or
the location resource coordination information includes the identity information of a target cell for which the base station activates the location resource, and instructs the base station to activate pre-configured dedicated location resource information.

18. A network node, wherein the network node is a local location management function entity or a location management function entity, and comprises a memory, a processor, a transceiver, and a computer program stored on the memory and executed by the processor, the processor executes the program to implement the location resource coordinating method according to claim 1.

19. A user equipment, comprising a memory, a processor, a transceiver, and a computer program stored on the memory and executed by the processor; wherein the processor executes the program to implement the location resource coordinating method according to claim 16.

20. A base station, comprising a memory, a processor, a transceiver, and a computer program stored on the memory and executed by the processor; wherein the processor executes the program to implement the location resource coordinating method according to claim 17.

* * * * *